US012743653B2

(12) United States Patent
Lu et al.

(10) Patent No.: US 12,743,653 B2
(45) Date of Patent: Sep. 22, 2026

(54) METHODS, DEVICES AND COMPUTER STORAGE MEDIA FOR ANOMALY DETECTION

(71) Applicant: Telefonaktiebolaget LM Ericsson (publ), Stockholm (SE)

(72) Inventors: Wenjuan Lu, Shanghai (CN); Yizong Meng, Shanghai (CN); Xiaojun Yin, Shanghai (CN); Ting Zhu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1144 days.

(21) Appl. No.: 17/629,033

(22) PCT Filed: Jun. 15, 2020

(86) PCT No.: PCT/CN2020/096127
§ 371 (c)(1),
(2) Date: Jan. 21, 2022

(87) PCT Pub. No.: WO2021/017665
PCT Pub. Date: Feb. 4, 2021

(65) Prior Publication Data

US 2022/0269989 A1 Aug. 25, 2022

(30) Foreign Application Priority Data

Jul. 26, 2019 (WO) ................ PCT/CN2019/098021

(51) Int. Cl.
*G06F 11/00* (2006.01)
*G06F 11/30* (2006.01)
(Continued)

(52) U.S. Cl.
CPC ......... *G06N 20/00* (2019.01); *G06F 11/3006* (2013.01); *G06F 11/3447* (2013.01)

(58) Field of Classification Search
CPC ............. G06F 11/3006; G06F 11/3447; G06F 11/076; G06F 11/3419; G06F 11/3423
See application file for complete search history.

(56) References Cited

U.S. PATENT DOCUMENTS 10,061,677 B2 8/2018 Toledano
2016/0140584 A1 5/2016 Moghtaderi
(Continued)

FOREIGN PATENT DOCUMENTS

CN 109784042 A 5/2019

OTHER PUBLICATIONS

Chandola, V. et al., "Anomaly Detection: A Survey", ACM Computing Surveys, Jul. 2009, pp. 15:1-15:58, vol. 41, No. 3, Article 15.
(Continued)

*Primary Examiner* — Katherine Lin
(74) *Attorney, Agent, or Firm* — Sage Patent Group

(57) ABSTRACT

An FFT-IFFT-based anomalous point detection method with valid check is disclosed, which includes: if a difference between data indicated by a point on an original time series and data indicated by a corresponding point on a first time series, that is obtained by applying FFT, high frequency filtering, and IFFT to the original time series, is greater than a first preset threshold, performing interpolation on the point on the original time series to obtain a second time series; applying the FFT, the high frequency filtering, and the IFFT to the second time series to obtain a third time series; and determining the point on the original time series as an anomalous point of the original time series, if a difference between the data indicated by the point on the original time series and data indicated by a corresponding point on the third time series is greater than the first preset threshold. Also disclosed are an anomalous point detection method based on gradual change characteristics of data, an anoma-
(Continued)

lous interval detection method based on a dynamic sliding window, and corresponding anomaly detection devices and computer storage medium.

16 Claims, 12 Drawing Sheets

(51) Int. Cl.
*G06F 11/34* (2006.01)
*G06N 20/00* (2019.01)

(56) References Cited

U.S. PATENT DOCUMENTS

2018/0241693 A1 8/2018 Patil et al.
2019/0155672 A1 5/2019 Wang et al.
2019/0385057 A1* 12/2019 Litichever ............... H04L 63/14

OTHER PUBLICATIONS

Liu, F. et al., "Isolation-based Anomaly Detection", ACM Transactions on Knowledge Discovery from Data, Mar. 2012, pp. 1-44, vol. 6, Issue 1.
Pyayt, A.L., "Data-driven methods in application to flood defence systems monitoring and analysis", University of Amsterdam, UvA-DARE (Digital Academic Repository), Dec. 31, 2014, retrieved on Jul. 4, 2023, pp. 18-41.
Anonymous, "Detect and replace outliers in data—MATLAB filloutliers—Mathworks Deutschland", Feb. 24, 2018, retrieved Jul. 4, 2023, pp. 1-12.
Office Action mailed Jan. 9, 2025 for Chinese Patent Application No. 202080049980.8, 11 pages (English translation included).
Yu, Yufeng et al.; "Time series outlier detection based on sliding window prediction"; Journal of Computer Applications, vol. 34, Issue 8; Aug. 10, 2014; 5 pages.

* cited by examiner

1000

Time Series With Anomalous Points

S1001

Setting A First Window For A Time Series With Anomalous Points, Wherein A First Anomalous Point Is Taken As A Starting Position Of The First Window

S1003

The Number Of Anomalous Points Within The Window Is Not Smaller Than TH4?

No

S1011

Shifting The Window And Taking The Next Anomalous Point As The Starting Position Yes

S1005

Expanding The Window By A Preset Length To Obtain A Second Window

S1007

The Number Of Anomalous Points Within The Window Is Not Increased For A Preset Number Of Consecutive Expansions, Or The Consecutively Expanded Window Is Not Smaller Than The Maximum Window Threshold, Or The Number Of Anomalous Points Within The Window Is Smaller Than TH4

No

Yes

S1009

Determining The Window Before The Consecutive Expansions As The Anomalous Interval

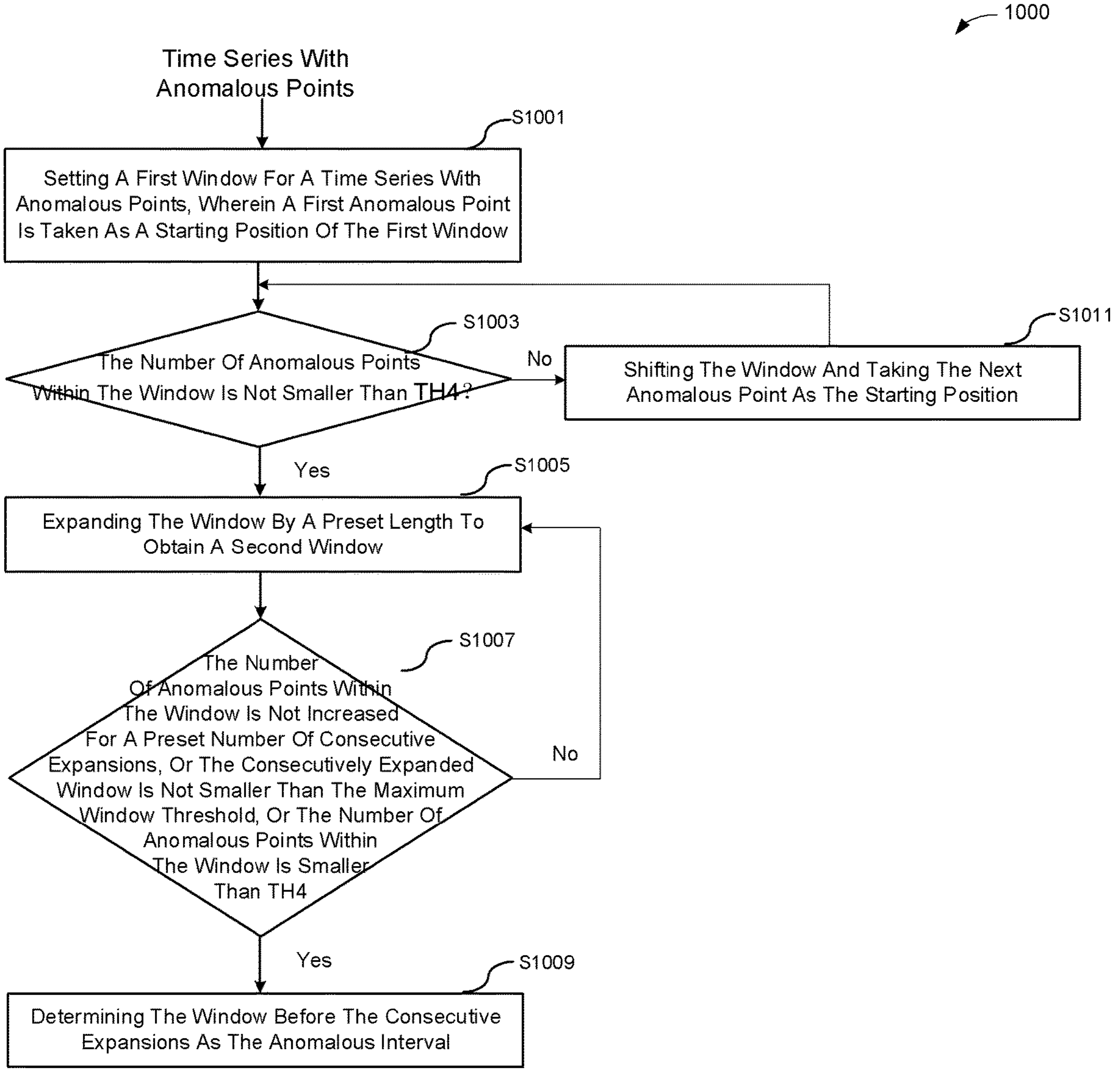

FIG. 10

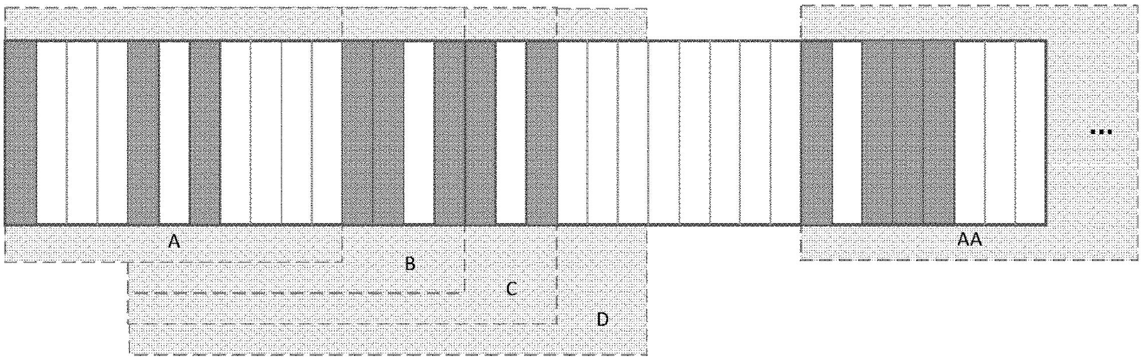

FIG. 11

METHODS, DEVICES AND COMPUTER STORAGE MEDIA FOR ANOMALY DETECTION

TECHNICAL FIELD

The present disclosure relates to the field of machine learning, and more particularly to methods, devices, and computer storage media for anomaly detection.

BACKGROUND

With the diversified marketing of traffic packages, the impact of traffic services on network load is becoming more and more serious, the massive connections of Internet of Things (IoT) particularly impose higher requirements for the monitoring of network management, and the challenges faced by network management systems are increasing. In the monitoring of traffic data by network management systems, anomaly usually causes pollution of normal traffic data: for example, in a system that uses a machine learning model to predict the future traffic changes in a period of time by learning the past traffic data, anomalies can interfere with the learning model, reducing the accuracy of future predictions. In practical applications, the anomalous points are usually removed before further analysis and processing, so that anomalous detection is required.

The purpose of anomaly detection is to identify peripheral objects that deviate from the general data distribution, so anomaly detection can be seen as a classification problem under data imbalance. For classification problems, according to the presence or absence of labels, they can be divided into supervised and unsupervised learning problem. However, in reality, since the anomaly detection problem is often unlabeled, the training data does not indicate which ones are anomalous points, so unsupervised learning must be used.

At present, commonly used anomaly detection methods include statistical and probabilistic models, linear models, proximity-based models, and nonlinear models, their characteristics are shown in Table 1 below:

TABLE 1

| Methods | Characters | Pros vs. Cons | |
|---|---|---|---|
| Statistical and probabilistic and models | Make assumptions about the distribution of the data and identify the "anomalousities" defined under the assumptions, so extreme analysis or hypothesis testing is often used. For example, the quartile method uses data points that are outside the quartile range as anomalies. | Pros<br>Cons | Speed is generally faster<br>The effect is not necessary good because of a strong "hypothesis" |
| Linear models | Assuming that the data is embedded in a low-dimensional space, data that does not perform well in a low-dimensional space can be considered an anomaly. For example PCA. | Pros<br>Cons | Reduce the complexity of data and identify the most important features<br>Loss useful information |
| Distance based models | Assume that the anomalous point is different from the normal point distribution, so the similarity is low; typical representative: KNN, Angel-based anomaly detection, LOF | Pros<br>Cons | Simple<br>Large amount of calculation; sensitive to parameter selection; cannot process data sets with different density regions |
| Nonlinear models | Using the multi-layer feed-forward neural network method, the input layer and the output layer have the same number of nodes. The neural network is used to train the relationship between input and output. The high reconstruction error is determined as an anomalous point; typical algorithm: RNN, AutoEncoder | Pros<br>Cons | Nonlinear term<br>Need a lot of tagged data to train the model |

The anomaly detection methods listed in the above Table 1 are more suitable for non-time series data in which the data is normally distributed: the position of an anomalous point is significantly deviated from the position of a normal point. For example, FIGS. 1*a* and 1*b* illustrate schematic diagrams of detecting an anomalous point by PCA and KNN algorithms, respectively.

However, the network traffic data is a kind of time series data, and the time series data is mainly composed of four parts of data: Trend, Cyclical, Seasonal, and Irregular.

Trend is a long pattern present in the time series;

Cyclic pattern exhibits up and down movements around a specified trend;

Seasonal pattern reflects regular fluctuations due to the seasonal factors and custom factors of people;

Since network traffic data is time series data, there are certain numerical differences between peaks and troughs.

First, the periodic variation of the time series will have peaks and valleys in the period. If a data point located in a trough is close to its peak value, if the above methods are simply used and the time factor is ignored, the trough value may be considered normal, causing inaccurate detection.

At the same time, the trend factor of the time series will make the data change with time, and the overall trend is uncertain. For example, for the data of a declined overall trend, the minimum value of all data is not necessarily an anomalous point.

Therefore, the above existing anomaly detection methods, when applied to time series data, such as network traffic data, face major challenges, such as a lower accuracy of anomaly detection and a lower recall rate.

SUMMARY

To this end, the present disclosure provides methods, devices, and computer storage media for anomaly detection, which enable effective anomaly detection, in particular for time series data, and thus achieve a higher accuracy and a higher recall rate.

According to a first aspect of the present disclosure, an anomaly detection method is provided. The anomaly detection method comprises: applying FFT (Fast Fourier transform), high frequency filtering and IFFT (Inverse Fast Fourier transform) to an original time series to obtain a first time series, wherein points on the original time series indicate data detected within a detection period of a node; comparing data indicated by each point on the original time series with data indicated by a corresponding point on the first time series; if a difference between data indicated by a point on the original time series and data indicated by a corresponding point on the first time series is greater than a first preset threshold, performing interpolation on the point on the original time series to obtain a second time series; applying the FFT, the high frequency filtering, and the IFFT to the second time series to obtain a third time series; and determining the point on the original time series as an anomalous point of the original time series, if a difference between the data indicated by the point on the original time series and data indicated by a corresponding point on the third time series is greater than the first preset threshold.

In an exemplary embodiment, performing the interpolation on the point on the original time series comprises: replacing a value indicated by the point on the original time series with an average value of data indicated by adjacent points of the point on the original time series.

In an exemplary embodiment, the first preset threshold is set to a preset integer multiple of a standard deviation of the difference between the data indicated by the point on the original time series and the data indicated by the corresponding point on the first time series.

In an exemplary embodiment, the anomaly detection method further comprises: for a time within a detection cycle of the node, extracting data detected at the time of each of detection cycles within the detection period to generate time series at the time, wherein points on the time series at the time indicate data detected at the time within respective detection cycles; calculating a distance between each point and adjacent points on the time series at the time; comparing a calculated maximum distance with a second preset threshold; and determining a point with the maximum distance as an anomalous point, if the maximum distance is greater than the second preset threshold.

In an exemplary embodiment, the anomaly detection method further comprises: repeating the operations of calculating, comparing, and determining for points other than the anomalous point on the time series at the time, until the maximum distance is not greater than the second preset threshold, or a number of the determined anomalous points is greater than a third preset threshold.

In an exemplary embodiment, the distance between each point and the adjacent points is an average of distances of the point from a previous point and from a next point.

In an exemplary embodiment, before the distance between each point on the time series at the time and the adjacent points is calculated, the data indicated by the point on the time series at the time is preprocessed, wherein the preprocessing comprises at least one of: discarding all NaN (Not a Number) values; and normalizing the data.

In an exemplary embodiment, the second preset threshold is set by a grid method.

In an exemplary embodiment, the anomaly detection method further comprises:

- setting a first window for a time series with anomalous points, wherein a first anomalous point is taken as a starting position of the first window; and
- for the first window, performing an operation of determining an anomalous interval, which comprises: determining whether a number of anomalous points within the first window is not smaller than a fourth preset threshold; expanding the first window by a preset length to obtain a second window, if the number of anomalous points within the first window is not smaller than the fourth preset threshold; consecutively performing the operation of expanding the window by the preset length, until at least one of following conditions is met: the number of anomalous points within the window is not increased for a preset number of consecutive expansions, or the consecutively expanded window is not smaller than a maximum window threshold, or the number of anomalous points within the window is smaller than the fourth preset threshold; and determining the window before the consecutive expansions as the anomalous interval.

In an exemplary embodiment, the anomaly detection method further comprises: shifting the first window to arrive at a third window, if the number of anomalous points within the first window is smaller than the fourth preset threshold, wherein a second anomalous point is taken as a starting position of the third window, and a length of the third window is equal to that of the first window; determining whether the number of anomalous points within the third window is not smaller than the fourth preset threshold; expanding the third window by the preset length to obtain a fourth window, if the number of anomalous points within the third window is not smaller than the fourth preset threshold; consecutively performing the operation of expanding the window by the preset length, until at least one of following conditions is met: the number of anomalous points within the window is not increased for a preset number of consecutive expansions, or the consecutively expanded window is not smaller than a maximum window threshold, or the number of anomalous points within the window is smaller than the fourth preset threshold; and determining the window before the consecutive expansions as the anomalous interval.

In an exemplary embodiment, the fourth preset threshold is proportional to a current window length.

According to a second aspect of the present disclosure, an anomaly detection device is provided. The anomaly detection device comprises: a processor; and a memory storing computer instructions which, when executed by the processor, cause the anomaly detection device to perform the method according to the first aspect of the present disclosure.

According to a third aspect of the present disclosure, a computer storage medium is provided, the computer storage medium storing computer instructions which, when executed by at least one processor, cause the at least one processor to perform the method according to the first aspect of the present disclosure.

According to the technical solutions of the embodiment of the present disclosure, the first time series is obtained by applying the FFT, high frequency filtering, and IFFT to the original time series; if the difference between the data indicated by the point on the original time series and the data indicated by the corresponding point on the first time series is greater than the preset threshold, interpolation is performed on the point on the original time series to obtain the second time series; then, the third time series is obtained by applying the FFT, high frequency filtering, and IFFT to the second time series; and the point on the original time series is determined as the anomalous point, if the difference between the data indicated by the point on the original time series and data indicated by the corresponding point on the third time series is greater than the preset threshold. As such, false positive detection of an anomalous point (that is, falsely determining a normal point as an anomalous point) may be avoided effectively.

For a time within the detection period of the node, data detected at the time of each detection cycle within the detection period is extracted to generate time series at the time; the distance between each point on the time series at the time and adjacent points is determined; the point with a maximum distance is determined as the anomalous point, if the calculated maximum distance is greater than the preset threshold, i.e., using gradual change characteristics of fore-and-aft data points on the time series at the specific time to determine the anomalous point(s) in a certain cycle at that time, and then obtaining the anomalous points on the original time series at the respective times, which may avoid false negative detection of an anomalous point (that is, falsely determining an anomalous point as a normal point) effectively.

In addition, the dynamic sliding window is applied to the time series with anomalous points to determine the anomalous interval, which may effectively detect a longer anomalous period caused by the restart of the device, further reduce the miss rate, and improve the precision and the recall rate of the anomaly detection.

BRIEF DESCRIPTION OF THE DRAWING

FIG. 10 schematically illustrates a flowchart of an anomalous interval detection method based on a dynamic sliding window according to an exemplary embodiment of the present disclosure;

FIG. 11 schematically illustrates an example where a dynamic sliding window is applied to a time series with anomalous points to detect an anomalous interval according to exemplary embodiments of the present disclosure;

DETAILED DESCRIPTION

As mentioned above, the anomaly detection scheme proposed by the present disclosure is mainly for data with characteristics of time series, which mainly has characteristics such as trend, periodicity, seasonality, and irregularity. It should be understood that the application scenarios of the present disclosure are applicable to all anomalous data detection, including but not limited to mobile communication networks, fixed networks, Internet of Things, and various vertical manufacturers. The anomaly detection scheme according to the present disclosure will be described in detail below with reference to specific examples. In the following description for the present disclosure, traffic data will be used as an example of time series data. It should be understood that the time series data involved in the present disclosure is not limited to this, but may cover any data having the above characteristics of time series.

It is assumed that the granularity of traffic data to which the exemplary embodiments of the present disclosure are directed is 15 minutes, that is, there are 96 traffic data for one node in one day. For example, a part of data of the index of Number of Attached Subscribers for a certain MME (Mobility Management Entity) node of an operator is shown in Table 2 below.

TABLE 2

| DATETIME_ID | AttachedSub |
|---|---|
| Mar. 12, 2018 7:00 | 619291 |
| Mar. 12, 2018 7:15 | 627647 |
| Mar. 12, 2018 7:30 | 636831 |
| Mar. 12, 2018 7:45 | 645681 |
| Mar. 12, 2018 8:00 | 653584 |
| Mar. 12, 2018 8:15 | 661191 |
| Mar. 12, 2018 8:30 | 668002 |
| Mar. 12, 2018 8:45 | 672679 |
| Mar. 12, 2018 9:00 | 676679 |
| Mar. 12, 2018 9:15 | 680130 |
| Mar. 12, 2018 9:30 | 682386 |

For example, reference may be made to the schematic diagrams given in FIGS. 2a~2c and 3 which illustrate at least one characteristic of time series data.

Figure 1A:
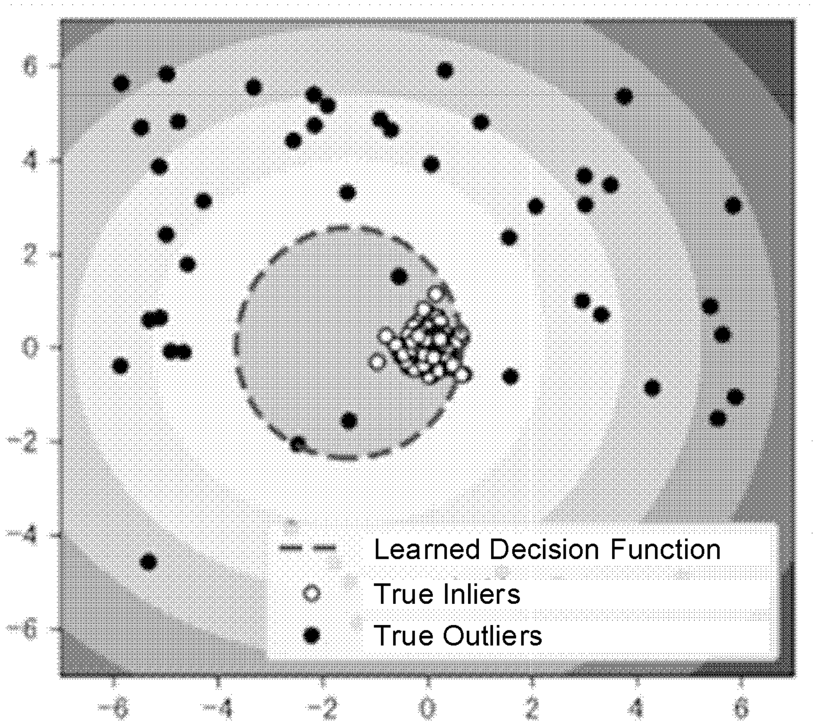
FIGS. 1*a* and 1*b* schematically illustrate schematic diagrams for detecting anomalous points using a PCA algorithm and a KNN algorithm, respectively.
Figure 1B:
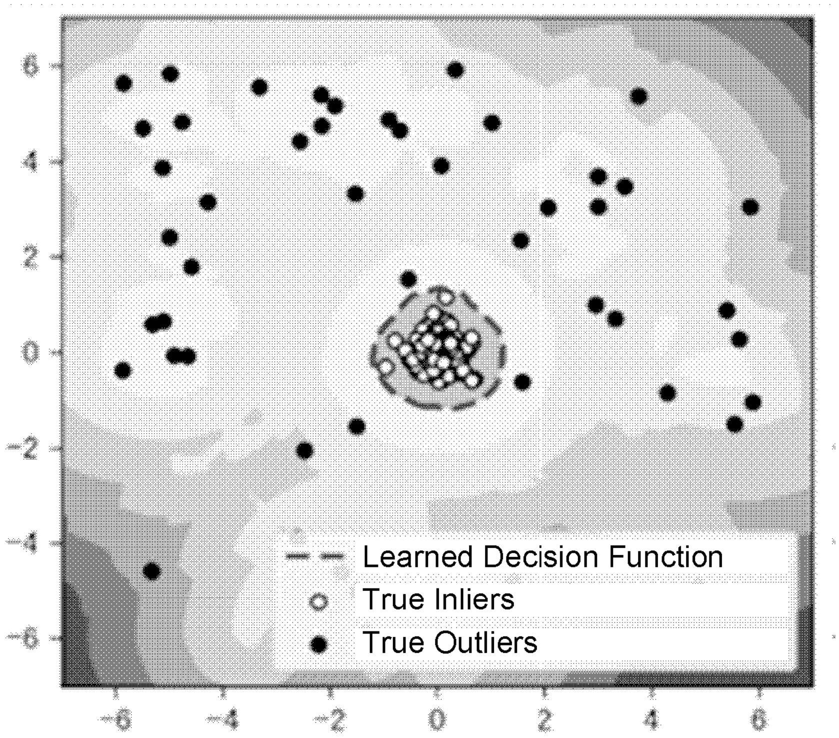
Figure 2A:
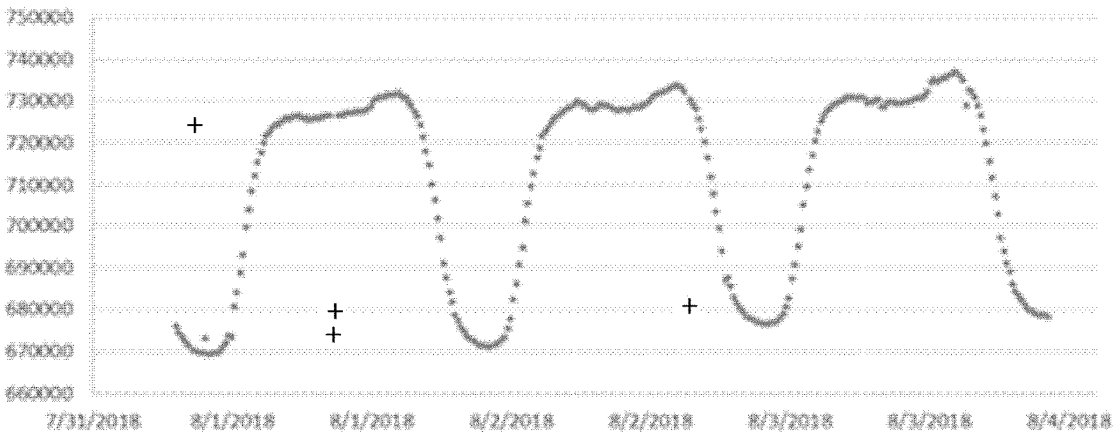
FIGS. 2*a*, 2*b*, and 2*c* schematically illustrate trend graphs of indexes of Numbers of Attached Subscribers during three days, one month, and the Spring Festival, respectively.
Figure 2B:
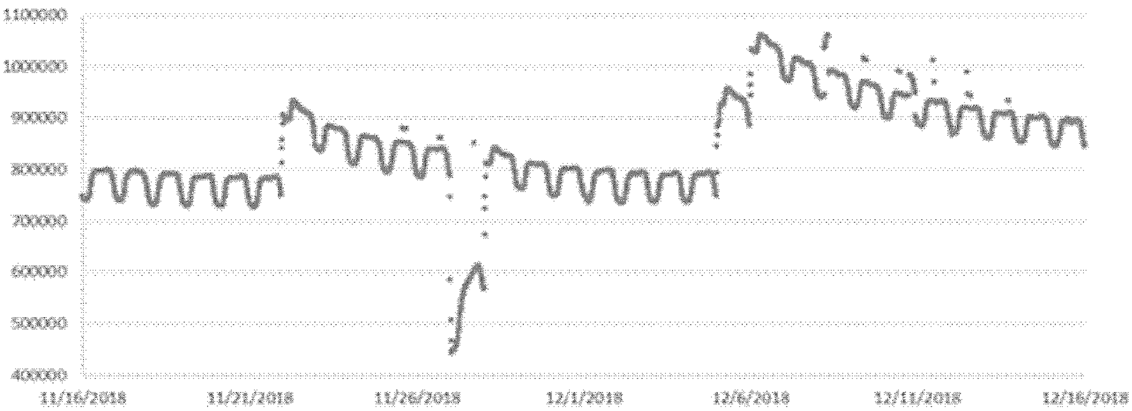
Figure 2C:
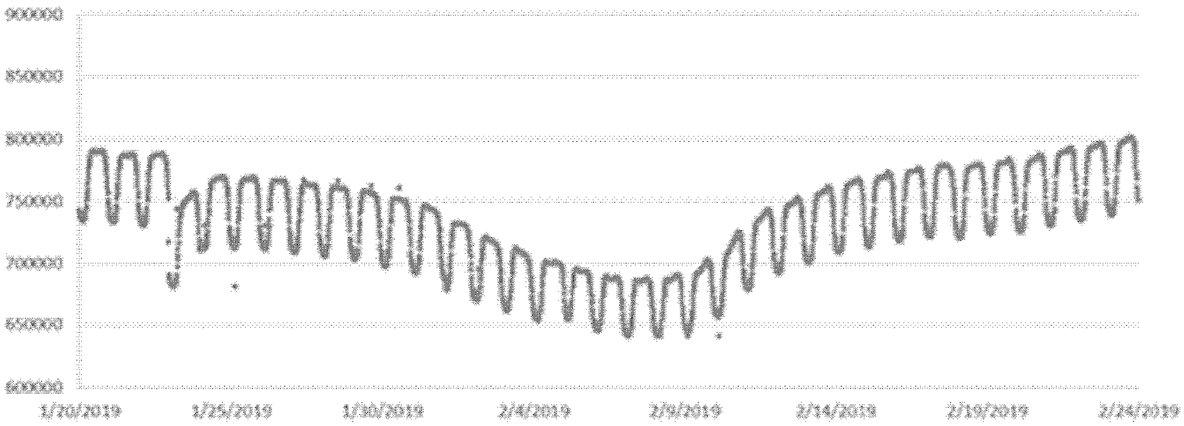
Figure 3:
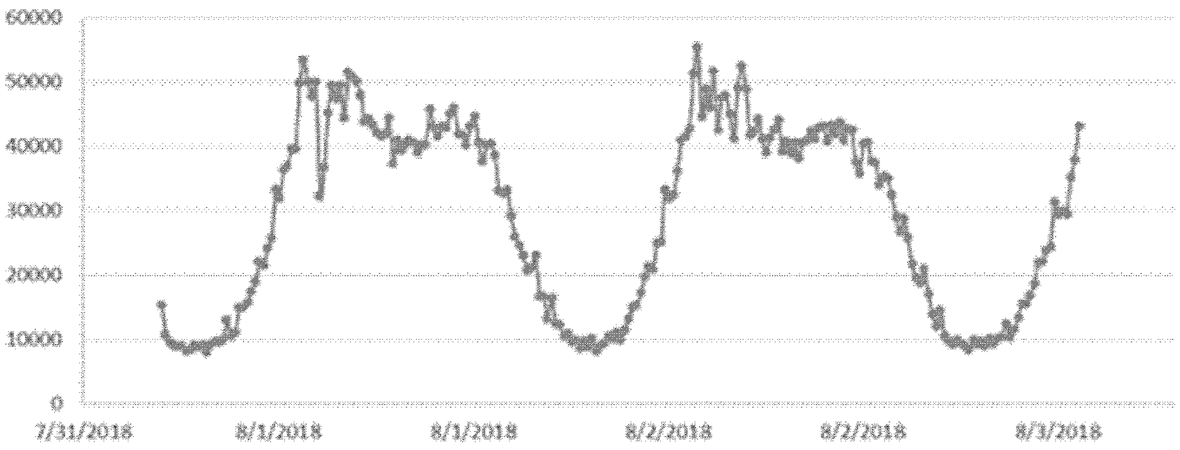
FIG. 3 schematically illustrates a trend graph of an index of Number of Attach Requests during two days.

FIGS. 2a, 2b, and 2c schematically illustrate trend graphs of indexes of Numbers of Attached Subscribers, as an example of time series data, during three days, one month, and the Spring Festival, respectively; and FIG. 3 schematically illustrates a trend graph of an index of Number of Attach Requests, as another example of time series data, during two days.

Referring to the index of Number of Attached Subscribers during three days as shown in FIG. 2a, it can be seen that the variation range in one day is larger, and there are many anomalous jumping points (points denoted by "+"). Referring to the index of Number of Attached Subscribers during one month as shown in FIG. 2b, it can be seen that in addition to the individual jumping points, there are anomalous interval segments due to operations of some devices, and the duration of anomalous period is uncertain. Referring to the index of Number of Attached Subscribers during the Spring Festival as shown in FIG. 2c, it can be seen that there may be a change deviating from the normal trend before and after the Spring Festival (2019/02/04-2019/02/10) due to a holiday effect. However, the holiday trend is normal, and not an anomalous point. Referring to the index of Number of Attach Requests during two days as shown in FIG. 3, it can be seen that there are a number of smaller jumps in the data of the index of Number of Attach Requests, which has larger unstability than that of the index of Numbers of Attached Subscribers.

An anomalous point of a time series refers to a data point that deviates from a normal trend (except holiday trends). For example, the anomalous points may be classified into the following three categories:

1. Individual jumping points—Individual jumping points may exist in the traffic due to e.g., hot events, temporary adjustment of O&M (Operation and Maintenance) configuration data, transient exceptions of web servers, etc.;
2. Anomalous interval segments due to user transfer that is caused by the restart of the device—For example, when some node device restarts, the user data in the corresponding time period will fluctuate greatly. The specific performance is that the data suddenly drops and cannot be restored in a short time;
3. Anomalous interval segments which are caused by a part of users being transferred to the current device because of the restart of some devices—The specific performance is that the data rise sharply with different amplitudes.

For anomalous point detection, the exemplary embodiments of the present disclosure provide two detection methods:

1) an anomalous point detection method based on FFT-IFFT using valid check, and 2) an anomalous point detection method based on gradual change characteristics of data.

In addition, for the time series with anomalous points, the exemplary embodiments of the present disclosure also provide an anomalous interval detection method based on a dynamic sliding window.

It should be understood that the above two anomalous point detection methods and the anomalous interval detection method based on a dynamic sliding window proposed by the exemplary embodiments of the present disclosure can be used separately or in combination according to actual requirements, which are not limited in the present disclosure. The use of the methods, either separately or in combination, will fall within the protection scope of the present disclosure.

For example, in an exemplary embodiment, according to the actual requirements, after the anomalous points are detected using the anomalous point detection method based on FFT-IFFT using valid check, the anomalous intervals can be further determined using the anomalous interval detection method based on the dynamic sliding window.

In another exemplary embodiment, according to the actual requirements, after the anomalous points are detected using the anomalous point detection method based on the gradual change characteristics of data, the anomalous intervals can be further determined using the anomalous interval detection method based on the dynamic sliding window, if necessary.

In yet another exemplary embodiment, according to the actual requirements, after the anomalous points are detected using both of the anomalous point detection method based on FFT-IFFT using valid check and the anomalous point detection method based on the gradual change characteristics of data, an union of the anomalous points detected by the above two anomalous point detection methods can be operated to obtain a time series with anomalous points, and the anomalous interval detection method based on a dynamic sliding window may be applied to the time series to determine an anomalous interval.

In still another exemplary embodiment, according to the actual requirements, certain weights may be assigned to the anomalous point detection method based on FFT-IFFT using valid check and the anomalous point detection method based on the gradual change characteristics of data for detecting the anomalous points, and an union of the anomalous points detected by the above two anomalous point detection methods can be operated to obtain a time series with anomalous points, and then the anomalous interval detection method based on the dynamic sliding window may be applied to the time series to determine an anomalous interval.

The above two anomalous point detection methods and the anomalous interval detection method using the dynamic sliding window will be described in detail below with reference to the drawings.

Figure 4:
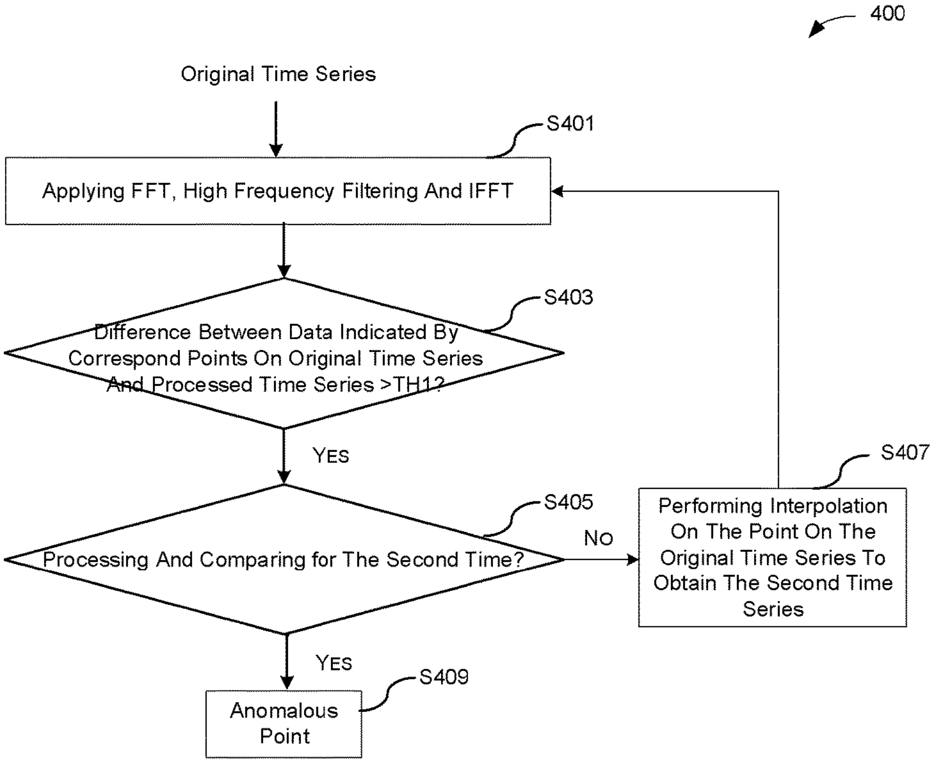
FIG. 4 schematically illustrates a flowchart of an FFT-IFFT-based anomalous point detection method with valid check, according to an exemplary embodiment of the present disclosure.

With reference to FIG. 4, FIG. 4 schematically illustrates a flowchart of an FFT-IFFT-based anomalous point detection method 400 with valid check, according to an exemplary embodiment of the present disclosure.

First, in step S401, FFT, high frequency filtering, and IFFT processing are applied to an original time series to obtain a first time series, wherein points in the original time series indicate data detected during a detection cycle of a node.

In particular, the FFT processing is used to transform the points in the original time series from the time domain to the frequency domain, and extract features of the time series in the frequency domain; the high frequency filtering is used to remove the high frequency part (that is, reducing the noise) of the time series; and then the IFFT processing is used to restore the frequency domain data back to the time domain data to obtain the first time series.

Figure 5A:
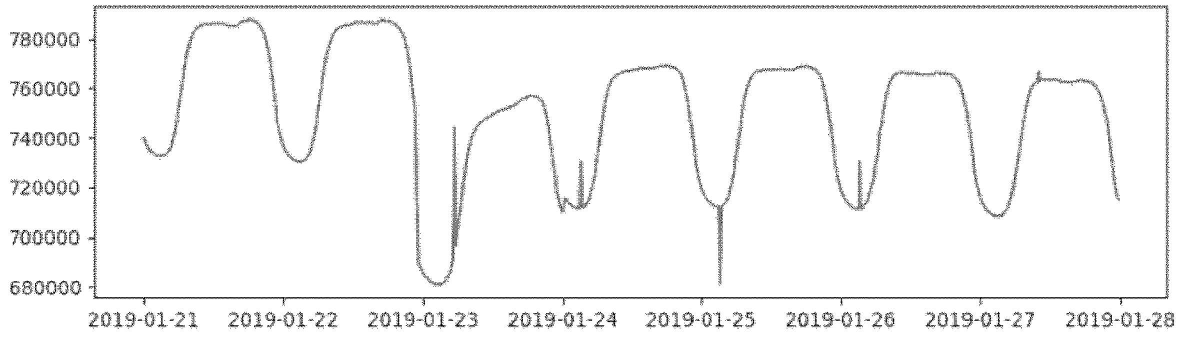
FIGS. 5*a*, 5*b*, and 5*c* schematically illustrate an original sequence diagram, and diagrams of high frequency and low frequency parts of a time series before FFT-IFFT high frequency filtering, respectively.
Figure 5B:
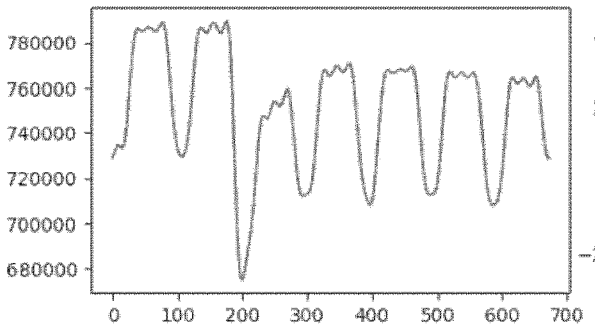
Figure 5C:
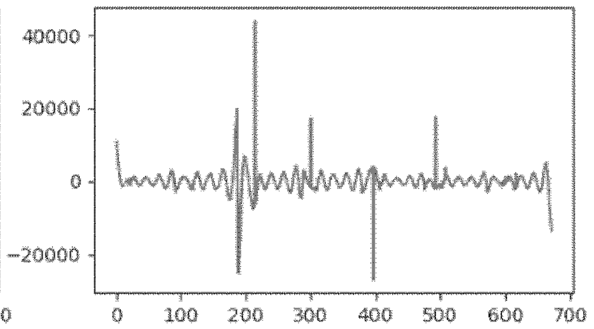

FIGS. 5*a*, 5*b*, and 5*c* schematically illustrate an original sequence diagram, and diagrams of high frequency and low frequency parts of a time series before FFT-IFFT high frequency filtering, respectively. As can be seen from FIGS. 5*a*~5*c*, data points that change significantly in the sequence diagram of the high frequency part of the time series correspond to anomalous points on the original sequence diagram of the time series. Therefore, the anomalous points may be effectively eliminated by removing the high frequency part.

Next, in step S403, the data indicated by the respective points on the original time series are respectively compared with the data indicated by the corresponding points on the first time series.

If a difference between data indicated by a point on the original time series and data indicated by a corresponding point on the first time series is greater than a preset threshold (denoted here by TH1), the method 400 proceeds to step S405, where it is determined whether the operations of the FFT, the high frequency filtering, and the IFFT processing and the data comparison are performed for the second time.

In an exemplary embodiment, TH1 is set to a preset integer multiple of the standard deviation of the difference between the data of the point on the original time series and the data indicated by the corresponding point on the first time series.

Obviously, the operations of the FFT, the high frequency filtering, and the IFFT processing as well as the data comparison in the method 400 have only been performed once till now. The method 400 therefore proceeds to step S407, where the point(s) on the original time series may be regarded as quasi-anomalous point(s). Interpolation is performed on the quasi-anomalous points to obtain a second time series.

In particular, said performing the interpolation on the point on the original time series may include: replacing a value indicated by the point on the original time series with an average value of data indicated by adjacent points (a previous point and a next point) of the point on the original time series.

Then, the method 400 returns to step S401, where the FFT, the high frequency filtering, and the IFFT processing are applied again to the second time series to obtain a third time series.

In step S403, the data indicated by the respective points on the original time series are respectively compared with the data indicated by the corresponding points on the third time series.

If a difference between the data indicated by the point on the original time series and the data indicated by the corresponding point on the third time series is still greater than TH1, the method 400 proceeds to step S405, where it is determined that this is the second time to perform the operations of the FFT, the high frequency and the IFFT processing, and the data comparison. The method 400 therefore proceeds to step S409, where the point(s) on the original time series may be determined as anomalous point(s) of the original time series.

Here, the following process may be referred to as valid check: determining quasi-anomalous point(s) in step S407, performing interpolation on the point(s) to obtain the second time series, and then performing the FFT, the high frequency filtering, and the IFFT processing on the second time series in step S401, and comparing the second time series with the original time series in step S403 to obtain secondary screened anomalous point(s). Since the quasi-anomalous point, determined by performing the FFT, the high frequency filtering, and the IFFT processing for the first time, and the comparison between the first time series and the original time series, may be false positive detection of an anomalous point (that is, falsely determining a normal point as an anomalous point), the false positive detection of the anomalous point may be effectively avoided with the valid check.

Figure 6A:
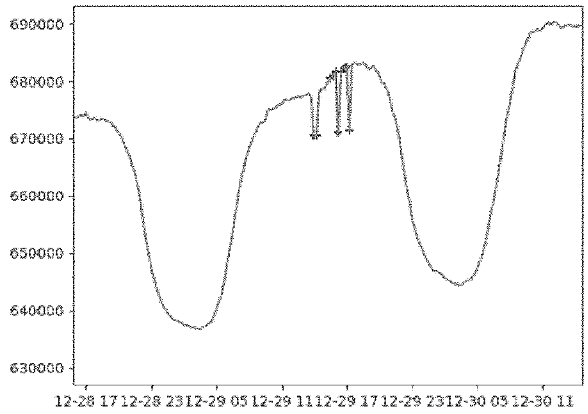
FIGS. 6*a* and 6*b* schematically illustrate effect diagrams of FFT-IFFT-based anomalous point detection methods with and without valid check according to an exemplary embodiment of the present disclosure, respectively.
Figure 6B:
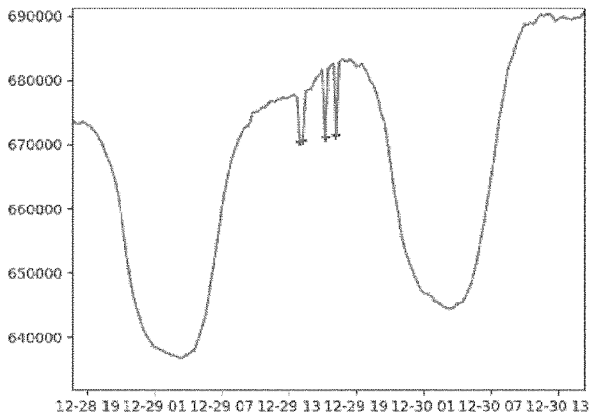

FIGS. 6*a* and 6*b* schematically illustrate effect diagrams of FFT-IFFT-based anomalous point detection methods with and without valid check according to an exemplary embodiment of the present disclosure, respectively, wherein points denoted by "+" are anomalous points identified using the two methods, respectively.

Here, the FFT-IFFT-based anomalous point detection method without the valid check comprises: applying FFT, high frequency filtering, and IFFT processing to an original time series to obtain a first time series; comparing the data indicated by each point on the original time series with the data indicated by the corresponding point on the first time series; and determining a point on the original time series as an anomalous point, if a difference between the data indicated by the point on the original time series and the data indicated by the corresponding point on the first time series is greater than a preset threshold.

As shown in FIG. 6*a*, many anomalous points may be falsely detected using the FFT-IFFT-based anomalous point detection method without the valid check; while as shown in FIG. 6*b*, the falsely detected anomalous points may be removed using the FFT-IFFT-based anomalous point detection method with the valid check, thereby reducing the probability of the false positive detection.

Figure 7:
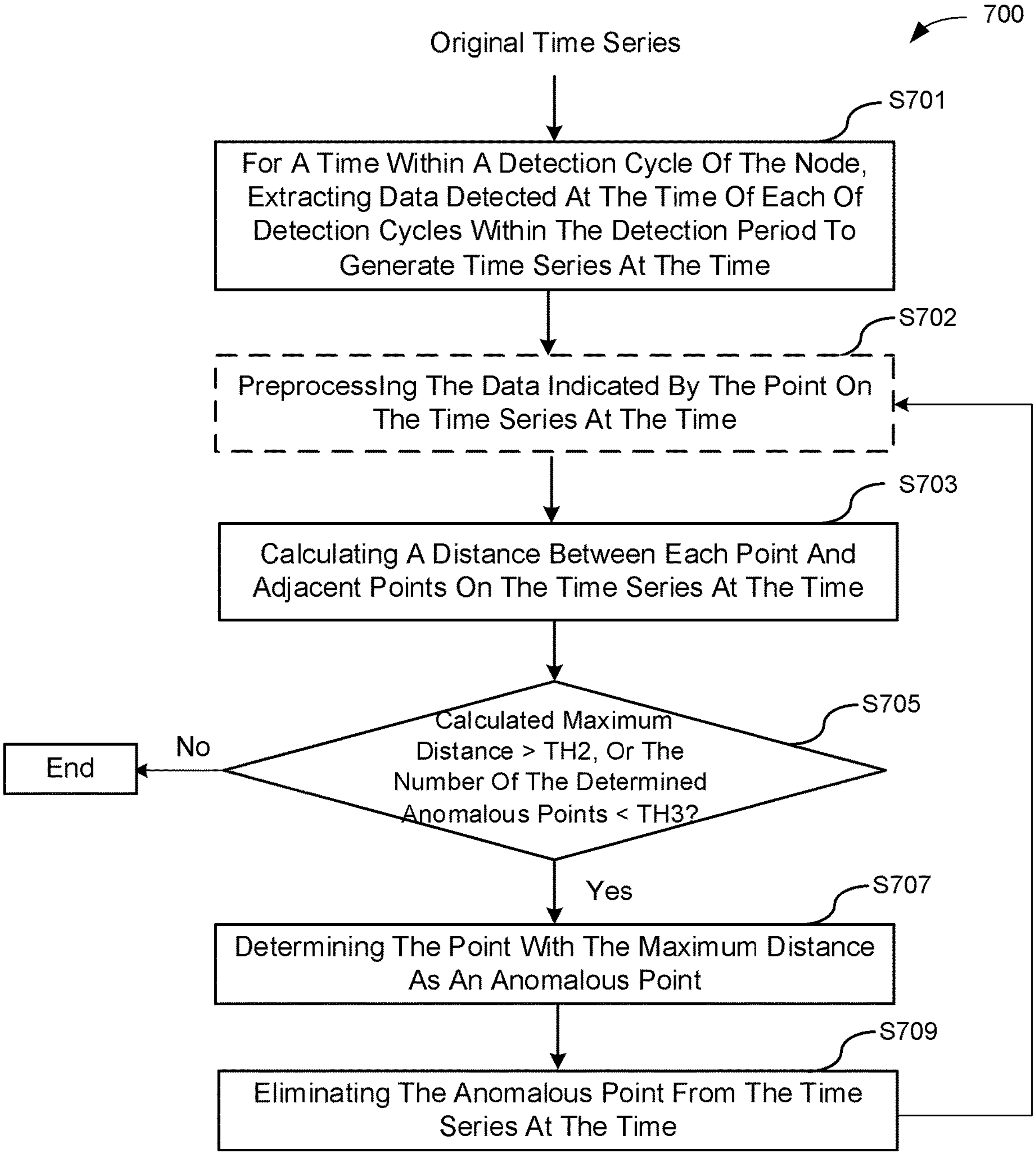
FIG. 7 schematically illustrates a flowchart of an anomalous point detection method based on gradual change characteristics of data according to an exemplary embodiment of the present disclosure.

Hereinafter, an anomalous point detection method 700 based on gradual change characteristics of data according to an exemplary embodiment of the present disclosure will be described with reference to FIG. 7.

Although time series data may have peaks and troughs in each detection cycle, data at a fixed time in the respective detection cycles may be extracted to form a time series at that time, and data indicated by points on the time series at that time typically changes in a relative flat manner. That is, it has gradual change characteristics. However, for an anomalous point, the distance between the anomalous point and its adjacent point on the time series at a specific time is larger. Thus, this exemplary embodiment of the present disclosure proposes an anomalous point detection method that utilizes the gradual change characteristics of data.

First, in step S701, for a time within a detection cycle of the node, data detected at that time of each of detection cycles within the detection period is extracted from the original time series to generate a time series at that time. Points on the time series at that time indicate the data detected at that time within the respective detection cycles.

Optionally, in step S702, the data indicated by the point on the time series at that time is preprocessed.

The preprocessing may include at least one of: discarding all NaN values and normalizing the data.

Next, in step S703, a distance between each point and adjacent points on the time series at that time is calculated.

Figure 8:
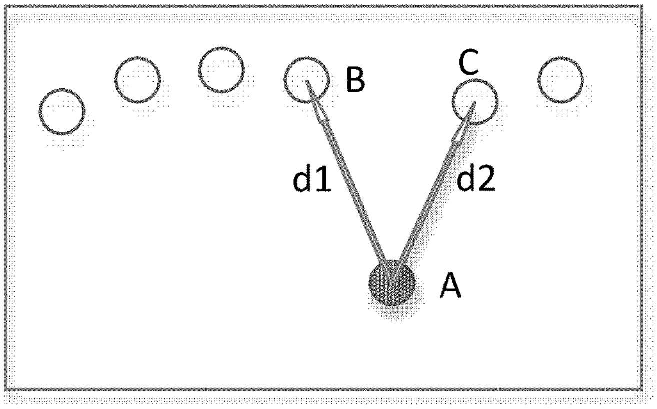
FIG. 8 schematically illustrates an example diagram of calculating a distance between a point and adjacent points according to an exemplary embodiment of the present disclosure.

In particular, referring to FIG. 8, the distance between each point (for example, Point A) and the adjacent points (for example, B, C) on the time series at that time is an average of the distance (d1) between the point (A) and the previous point (B) and the distance (d2) between the point (A) and the next point (C), i.e., (d1+d2)/2.

In step S705, the calculated maximum distance is compared with a preset threshold (here denoted by TH2). The maximum distance here refers to the maximum value of the distances calculated for each point on the time series at that time.

In an exemplary embodiment, TH2 may be set by a grid method.

If the maximum distance is greater than TH2 ("Yes" from S705), the method 700 proceeds to step S707, where the point having the maximum distance is identified as an anomalous point.

In step S709, the anomalous point is removed from the time series at that time.

Next, the operations of the preprocessing in step S702, the calculating in S703, the comparing in S705, and the determining in S707 are repeated for points other than the anomalous point on the time series at that time, until the calculated maximum distance is not greater than TH2, or the number of the determined anomalous points is greater than a preset threshold (denoted by TH3) (to prevent too many anomalous points from being detected) ("No" from S705).

Till now, all the anomalous points on the time series at that time can be determined.

It can be understood that in this exemplary embodiment of the present disclosure, assuming that the detection cycle is one day and the granularity is 15 minutes, 96 time series will be generated, which represent, for example, time series at 00:00, 00:15, . . . , 23:45, respectively. By performing the above method 700 for each of the time series, all the anomalous points on the time series at the 96 times can be determined, and a collection of them can be all of the anomalous points on the original time series.

Figure 9:
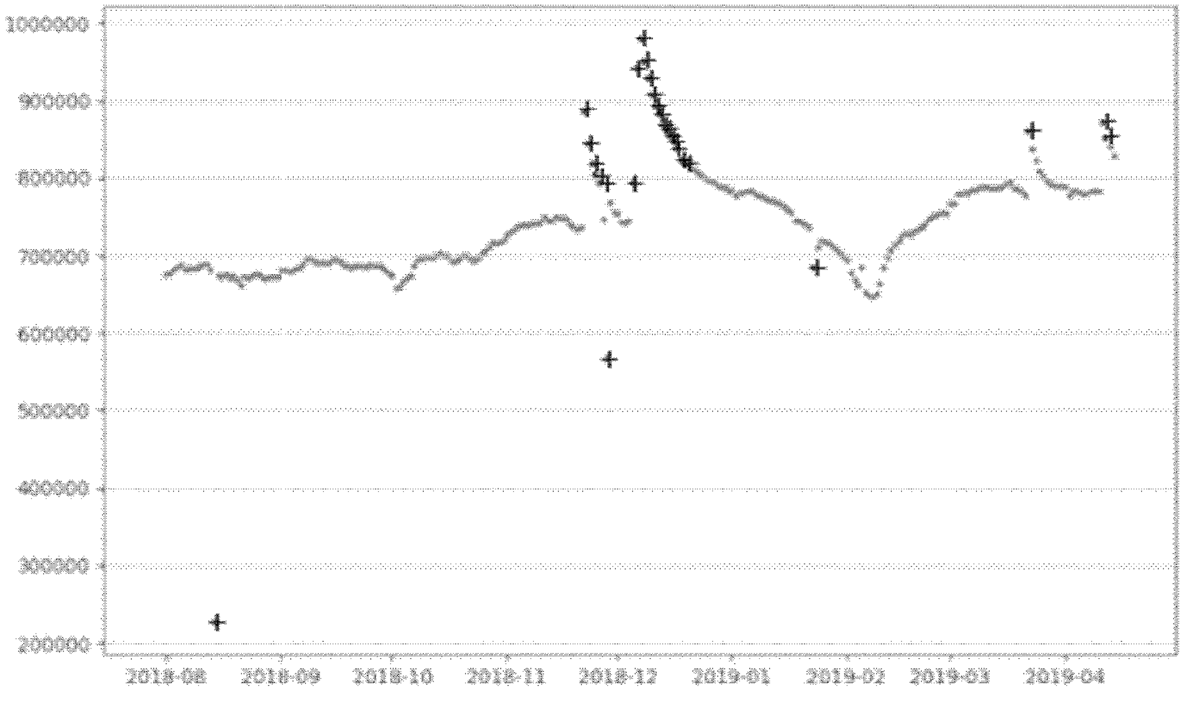
FIG. 9 schematically illustrates an effect diagram of applying an anomalous point detection method based on gradual change characteristics of data according to exemplary embodiments of the present disclosure.

FIG. 9 schematically illustrates an effect diagram of applying the anomalous point detection method based on gradual change characteristics of data according to an exemplary embodiment of the present disclosure, where points denoted by "." are normal points, and points denoted by "+" are anomalous points detected by the method 700. It can be seen from FIG. 9 that most of the anomalous points can be accurately detected, that is, false negative detection of an anomalous point (that is, falsely determining an anomalous point as a normal point) can be avoided effectively.

In order to further reduce the probability of false negative detection to improve the precision of the anomaly detection, and in order to improve the recall rate, an exemplary embodiment of the present disclosure also provides a method of detecting an anomalous interval by applying a dynamic sliding window algorithm to a time series with detected anomalous point(s).

The anomalous interval detection method based on the dynamic sliding window according to the exemplary embodiment of the present disclosure will be described with reference to FIGS. 10 and 11.

FIG. 10 schematically illustrates a flowchart of an anomalous interval detection method 1000 based on a dynamic sliding window according to an exemplary embodiment of the present disclosure.

In step S1001, a first window is set for a time series with anomalous point(s). The first anomalous point is taken as a starting position of the first window.

For the first window, operations for determining an anomalous interval are performed in steps S1003~S1011.

In particular, in step S1003, it is determined whether the number of anomalous points within the first window is not smaller than a preset threshold (here, denoted by TH4).

If the number of anomalous points within the first window is not smaller than TH4 ("Yes" from S1003), the method 1000 proceeds to step S1005, where the first window is expanded by a preset length to obtain a second window.

The operation of expanding the window by the preset length is consecutively performed, until at least one of the following conditions is met ("Yes" from S1007):

- the number of anomalous points within the window is not increased for a preset number of consecutive expansions, or
- the consecutively expanded window is not smaller than a maximum window threshold, or
- the number of anomalous points within the window is smaller than TH4.

TH4 is variable and proportional to the current window length. For example, TH4 may be ⅓ of the current window length.

At this time, the method 1000 proceeds to step S1009, where the window before the consecutive expansions is determined as the anomalous interval.

If the number of anomalous points within the first window is smaller than TH4 ("No" from S1003), the method 1000 proceeds to step S1011, where the first window is shifted to obtain a third window. The second anomalous point is taken as a starting position of the third window, and a length of the third window is equal to that of the first window.

For the third window, the above operations of determining an anomalous interval are performed in steps S1003~S1011.

In particular, in step S1003, it is determined whether the number of anomalous points within the third window is not smaller than TH4.

If the number of anomalous points within the third window is not smaller than TH4 ("Yes" from S1003), the method 1000 proceeds to step S1005, where the third window is expanded by the preset length to obtain a fourth window.

The operation of expanding the window by the preset length is consecutively performed, until at least one of the following conditions is met ("Yes" from S1007):

- the number of anomalous points within the window is not increased for a preset number of consecutive expansions, or
- the consecutively expanded window is not smaller than a maximum window threshold, or
- the number of anomalous points within the window is smaller than TH4.

At this time, the method 1000 proceeds to step S1009, where the window before the consecutive expansions is determined as the anomalous interval.

After one anomalous interval is determined, the window of the anomalous interval may be consecutively shifted to reach a fifth window. The next anomalous point after the previously described window of the anomalous interval is taken as a starting position of the fifth window, and a length of the fifth window is equal to that of the first window.

Next, for the fifth window, the above operations of determining an anomalous interval are performed in steps S1003~S1011.

FIG. 11 schematically illustrates an example where a dynamic sliding window is applied to a time series with anomalous points to detect an anomalous interval according to an exemplary embodiment of the present disclosure. In FIG. 11, a set composed of multiple white and gray chunks represents a time series, wherein each of the chunks indicates a data point, the white chunk indicates a detected normal point, and the gray chunk indicates a detected anomalous point.

In the example as shown in FIG. 11, a smaller initial window a is set first. The window starting position is the first anomalous point (the first gray chunk on the left side in FIG. 11). When the number of anomalous points within the window a is not smaller than TH4, the window a is expanded; otherwise, the window is continuously moved forward until the starting position of the window is the second anomalous point. Thus, the step size of each movement is inconstant.

Assuming that the number of anomalous points within the window a is smaller than TH4, which means the window a is not an anomalous interval, the window a is moved to a window b. Here, the length of the window b is equal to that of the window a.

If the number of anomalous points within the window b is not smaller than TH4 at this time, the window b is expanded to a window c.

Assuming that the number of anomalous points within the window cis still not smaller than TH4, the window cis consecutively expanded to a window d. It is determined that the window d is not an anomalous interval, and at the same time, the window c is determined to be an anomalous interval, if at least one of the following conditions is met: the number of anomalous points within the window d is not increased for a preset number of consecutive expansions, or the consecutively expanded window is not smaller than the maximum window threshold, or the number of anomalous points within the window d is smaller than TH4. Next, the window c is jumped out, and a next anomalous point is continuously searched for as the starting point of the next window aa.

It should be understood that the window cannot be expanded indefinitely, and cannot continue to be expanded when the maximum window threshold is reached.

Figure 12A:
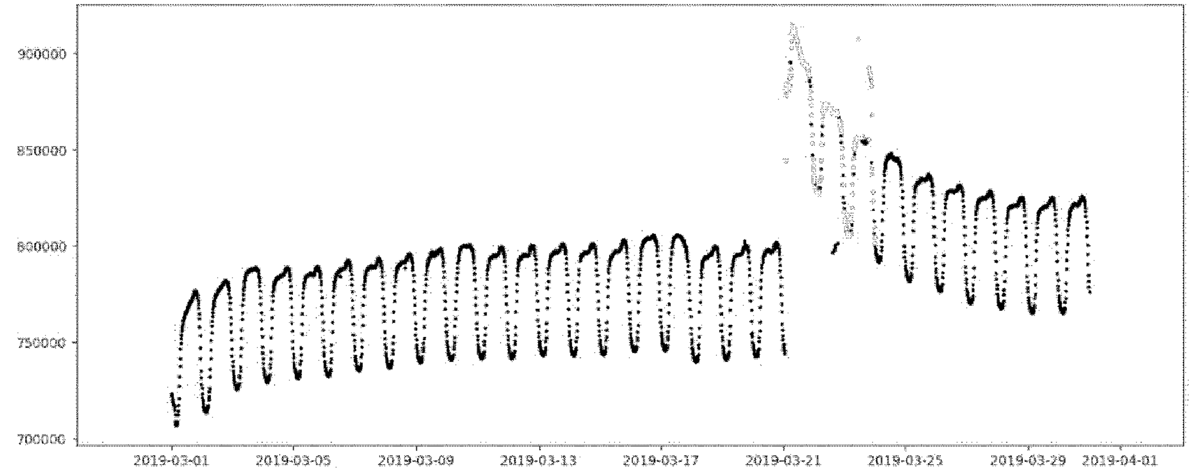
FIGS. 12*a* and 12*b* schematically illustrate effect diagrams of anomalous interval detection methods with and without applying a dynamic sliding window according to exemplary embodiments of the present disclosure, respectively.
Figure 12B:
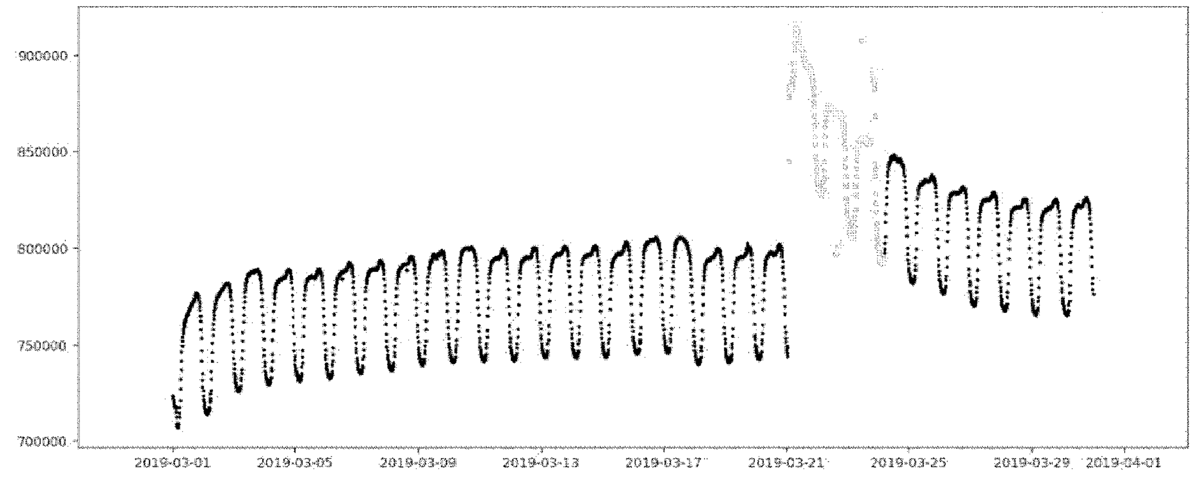

FIGS. 12*a* and 12*b* schematically illustrate effect diagrams of anomalous interval detection methods with and without applying a dynamic sliding window according to exemplary embodiments of the present disclosure, respectively.

Referring to FIG. 12*a*, if the anomalous interval detection method without applying the dynamic sliding window according to the exemplary embodiment of the present disclosure is used, only some anomalous points can be detected (denoted by light gray dots in FIG. 12*a*); and if the anomalous interval detection method with applying the dynamic sliding window according to the exemplary embodiment of the present disclosure is used, an anomalous interval (denoted by a light gray dot in FIG. 12*b*) can be detected, which enables most anomalous points to be detected, thereby increasing the recall rate.

Figure 13:
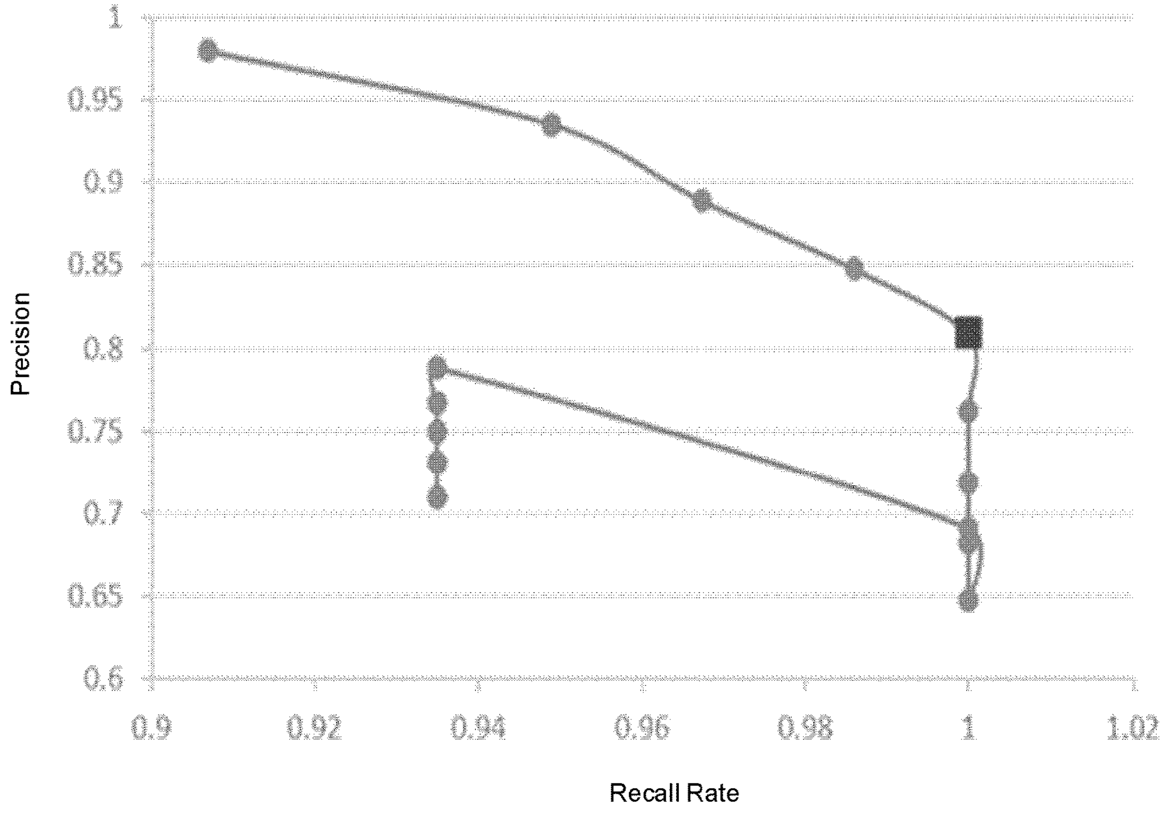
FIG. 13 schematically illustrates a precision and a recall rate of detecting anomalous intervals using a dynamic sliding window according to exemplary embodiments of the present disclosure.

FIG. 13 schematically illustrates a precision and a recall rate of detecting anomalous intervals using a dynamic sliding window according to an exemplary embodiment of the present disclosure.

Different initial sliding window lengths correspond to different recall rates and precisions. The recall rate and precision change with the initial sliding window length. Considering the adverse effects of network traffic anomalous points, in combination with the characteristics of time series data to which the exemplary embodiments of the present disclosure are directed, that is, the duration of the anomalous interval is generally greater than half a day (12*4 data points) and not greater than 7 days (7*24*4 data points), the initial sliding window length with a higher recall rate and a relatively high precision, i.e., 25, is usually selected. The threshold TH4 of the anomalous interval is set to the window length/3, and the maximum window threshold is set to the number of data points of 7 days (7*24*4). The length by which the anomalous interval is expanded is set to a random number between (5, 7).

Figure 14:
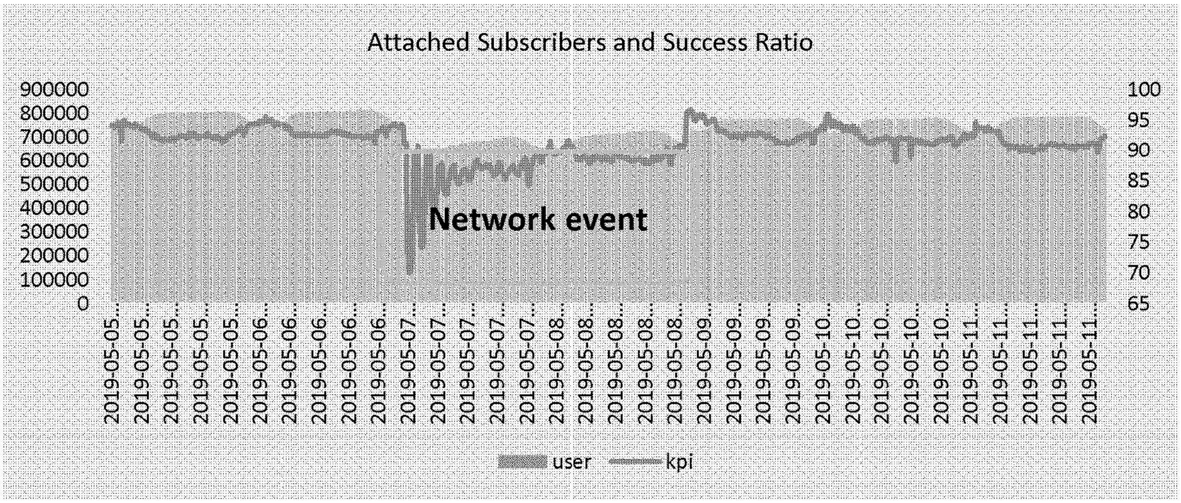
FIG. 14 schematically illustrates a diagram showing relationships between attached subscribers, a success ratio and network events.

Referring to FIG. 14, which schematically illustrates a diagram showing relationships between attached subscribers, a success ratio and network events. One week's measurement dataset from one MME node with real-time traffic may be selected for validation. The network event was mixing up with the attached KPI (key performance indicator) degradation. The timestamp of KPI lower than the defined threshold (90%) is expected to be marked as an outlier.

Figure 15:
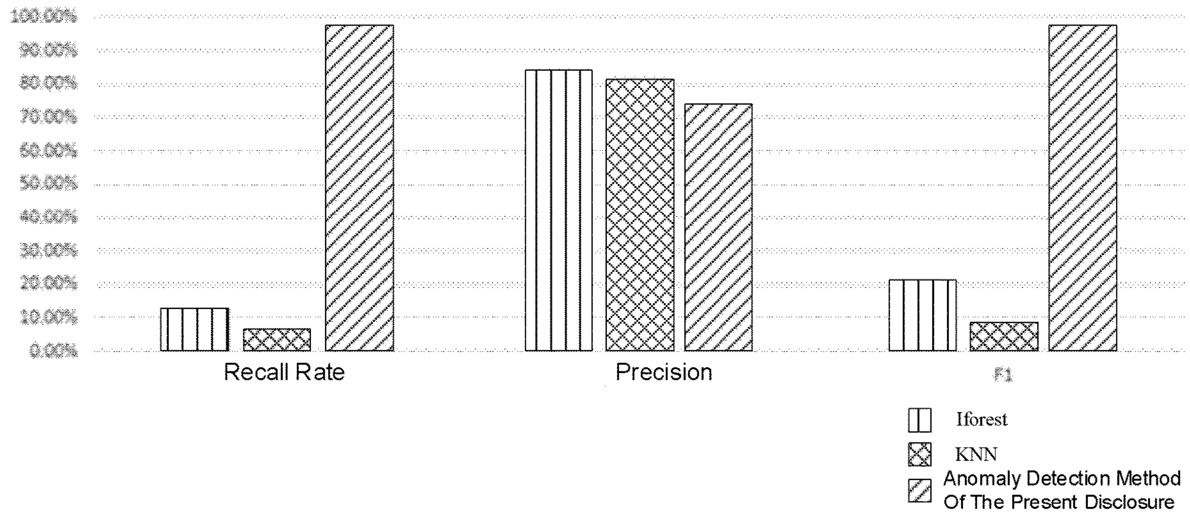
FIG. 15 schematically illustrates performance comparison of an IForest algorithm, a KNN algorithm, and an anomaly detection method according to exemplary embodiments of the present disclosure.

FIG. 15 schematically illustrates performance comparison of an IForest algorithm, a KNN algorithm, and an anomaly detection method according to exemplary embodiments of the present disclosure.

As can be seen from FIG. 15, the IForest algorithm and the KNN algorithm have very low recall rates and F1 values (F measure with $\alpha$=1), which mean that these two algorithms can only detect minor anomalous points. The anomaly detection method according to the exemplary embodiment of the present disclosure has a very high recall rate, precision and F1 value, which can satisfy the requirements of anomaly detection on the network traffic data.

The detection results of anomalous points using the IForest algorithm, the KNN algorithm, and the anomaly detection method according to the exemplary embodiment of the present disclosure are also listed in Table 3 below.

TABLE 3

| | | Detected Results Number | |
|---|---|---|---|
| | Real Number | Non-Outliers | Outliers |
| IForest | Non-Outliers | 495 | 4 |
| | Outliers | 152 | 21 |
| KNN | Non-Outliers | 477 | 22 |
| | Outliers | 146 | 27 |
| Anomaly Detection Method Of The Present Disclosure | Non-Outliers | 434 | 65 |
| | Outliers | 6 | 167 |

It can be seen that the anomaly detection method according to the exemplary embodiments of the present disclosure may avoid the false negative detection and the false positive detection of the anomalous points on the time series data effectively, thereby improving the precision and the recall rate of the anomaly detection.

The structures of anomaly detection devices according to exemplary embodiments of the present disclosure will be described with reference to FIGS. 16, 17 and 18.

Figure 16:
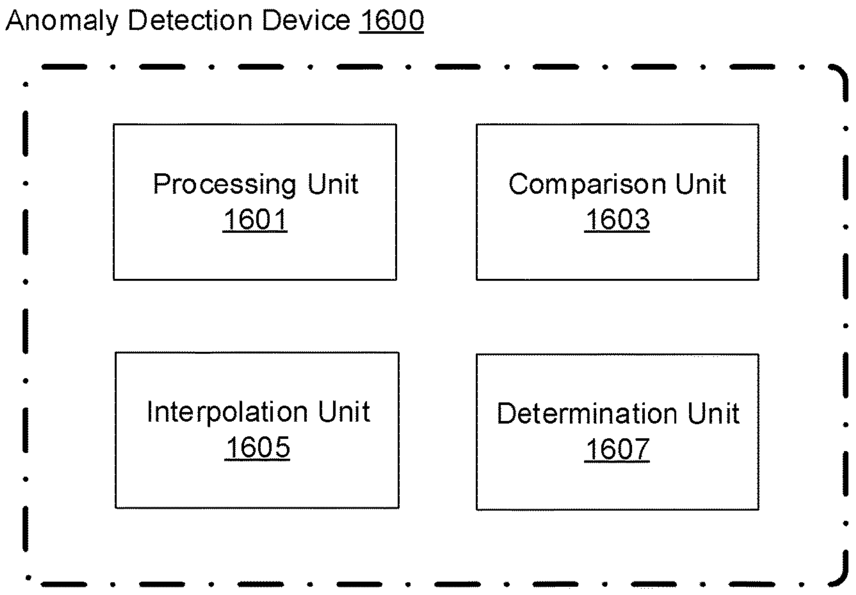
FIG. 16 schematically illustrates a structural block diagram of an anomaly detection device according to an exemplary embodiment of the present disclosure.

FIG. 16 schematically illustrates a structural block diagram of an anomaly detection device 1600 according to an exemplary embodiment of the present disclosure. The anomaly detection device 1600 in FIG. 16 may perform the FFT-IFFT-based anomalous point detection method 400 with valid check according to an exemplary embodiment of the present disclosure, as previously described with reference to FIG. 4. Therefore, some detailed descriptions related to the anomaly detection device 1600 may refer to the corresponding description in the FFT-IFFT-based anomaly point detection method 400 with valid check as described above.

As shown in FIG. 16, the anomaly detection device 1600 may comprise a processing unit 1601, a comparison unit 1603, an interpolation unit 1605, and a determination unit 1607.

The processing unit 1601 is configured to apply FFT, high frequency filtering and IFFT to an original time series to obtain a first time series, wherein points on the original time series indicate data detected during a detection period of a node.

The comparison unit 1603 is configured to compare data indicated by each point on the original time series with data indicated by a corresponding point on the first time series.

The interpolation unit 1605 is configured to perform interpolation on the point on the original time series to obtain a second time series, if a difference between data indicated by a point on the original time series and data indicated by the corresponding point on the first time series is greater than TH1.

In an exemplary embodiment, the interpolation unit 1605 is configured to replace a value indicated by the point on the original time series with an average value of data indicated by adjacent points of the point on the original time series.

In an exemplary embodiment, TH1 is set to a preset integer multiple of a standard deviation of the difference between the data indicated by the point on the original time series and the data indicated by the corresponding point on the first time series.

The processing unit 1601 is further configured to apply the FFT, the high frequency filtering, and the IFFT to the second time series to obtain a third time series.

The comparison unit 1603 is further configured to compare the data indicated by each point on the original time series with data indicated by a corresponding point on third first time series.

The determination unit 1607 is configured to determine the point on the original time series as an anomalous point, if a difference between the data indicated by the point on the original time series and the data indicated by a corresponding point on the third time series is greater than TH1.

Figure 17:
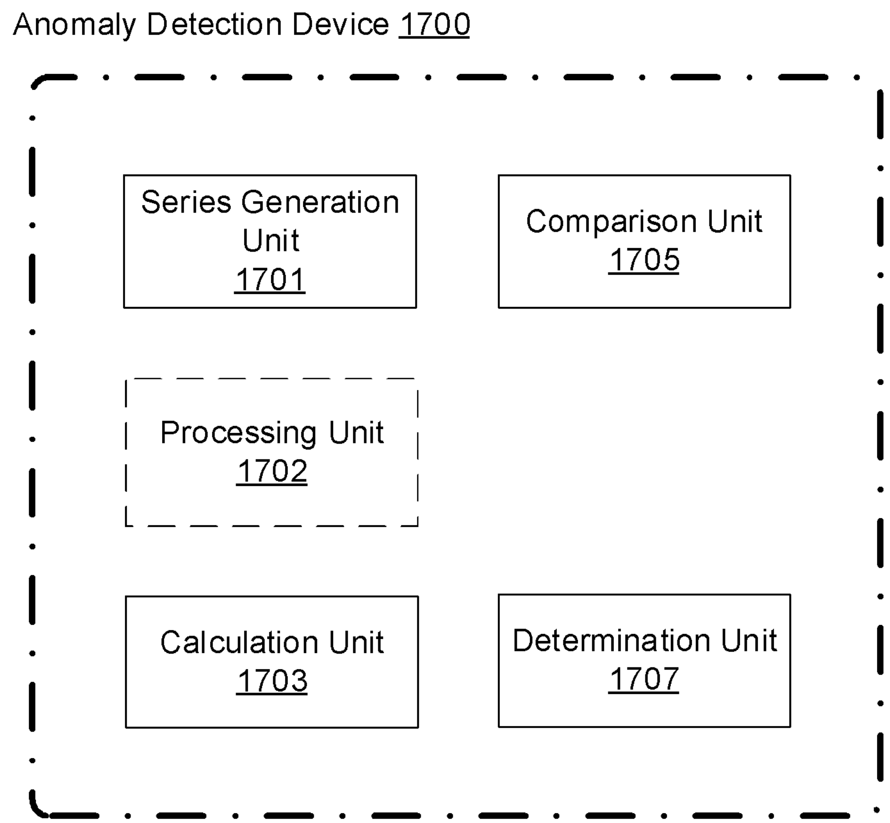
FIG. 17 schematically illustrates a structural block diagram of an anomaly detection device according to another exemplary embodiment of the present disclosure.

FIG. 17 schematically illustrates a structural block diagram of an anomaly detection device 1700 according to another exemplary embodiment of the present disclosure. The anomaly detection device 1700 in FIG. 17 may perform the anomalous point detection method 900 based on gradual change characteristics of data according to an exemplary embodiment of the present disclosure, as previously described with reference to FIG. 9. Therefore, some detailed descriptions related to the anomaly detection device 1700 may refer to the corresponding description in the anomalous point detection method 900 based on gradual change characteristics of data as described above.

As shown in FIG. 17, the anomaly detection device 1700 may comprise a series generation unit 1701, a calculation unit 1703, a comparison unit 1705 and a determination unit 1707.

The series generation unit 1701 is configured to: for a time within a detection cycle of a node, extract data detected at the time of each of detection cycles within the detection period to generate a time series at the time, wherein points on the time series at the time indicate data detected at the time within respective detection cycles.

The calculation unit 1703 is configured to calculate a distance between each point and adjacent points on the time series at the time.

In an exemplary embodiment, the distance between each point and the adjacent points is an average of distances between the point and a previous point and a next point.

The comparison unit 1705 is configured to compare the calculated maximum distance with TH2.

In an exemplary embodiment, TH2 is set by a grid method.

The determination unit 1707 is configured to determine the point with the maximum distance as the anomalous point, if the maximum distance is greater than TH2.

The calculation unit 1703, the comparison unit 1705 and the determination unit 1707 are further configured to repeat the operations of calculating, comparing, and determining, for points other than anomalous points on the time series at the time, until the maximum distance is not greater than TH2, or the number of the determined anomalous points is greater than TH3.

In an exemplary embodiment, the anomaly detection device 1700 may further comprise a processing unit 1702, which is configured to preprocess the data indicated by the point on the time series at the time, before the calculation unit 1703 calculates the distance between each point and the adjacent points on the time series at the time.

In an exemplary embodiment, the preprocessing comprises at least one of:

discarding all NaN values; and normalizing the data.

Although an anomaly detection device for performing the FFT-IFFT-based anomalous point detection method 400 with valid check and an anomaly detection device for performing anomalous point detection method 900 based on gradual change characteristics of data are shown by two separate anomaly detection devices 1600 and 1700, respectively, it should be understood that they can be implemented in two separate devices or in the same device, which are not limited in the present disclosure.

Figure 18:
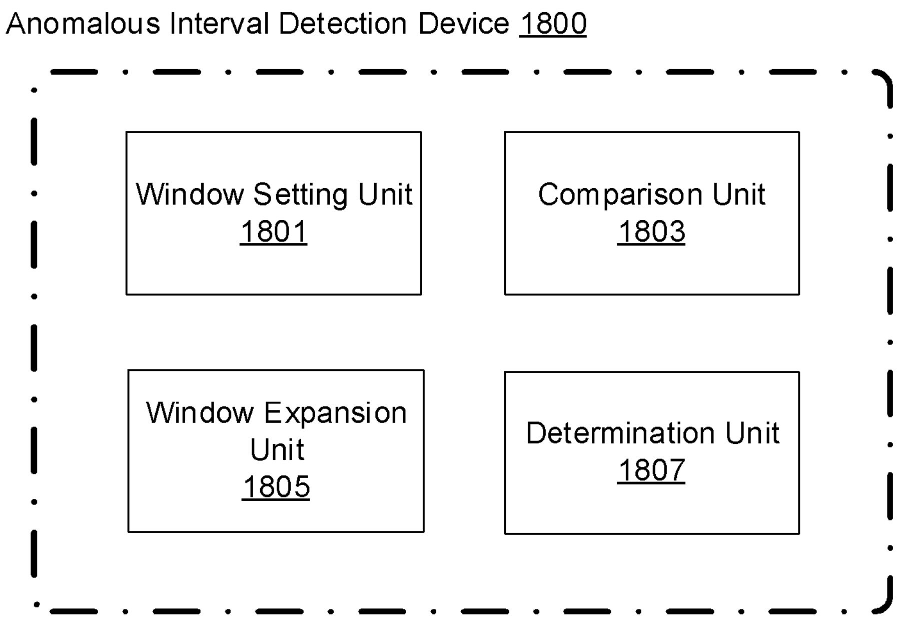
FIG. 18 schematically illustrates a structural block diagram of an anomalous interval detection device according to an exemplary embodiment of the present disclosure.

FIG. 18 schematically illustrates a structural block diagram of an anomalous interval detection device 1800 according to an exemplary embodiment of the present disclosure. The anomalous interval detection device 1800 in FIG. 18 may perform the anomalous interval detection method 1000 based on a dynamic window according to an exemplary embodiment of the present disclosure, as previously described with reference to FIG. 10. Therefore, some detailed descriptions related to the anomalous interval detection device 1800 may refer to the corresponding description in the anomalous interval detection method 1000 based on a dynamic window as described above.

As shown in FIG. 18, the anomalous interval detection device 1800 may comprise a window setting unit 1801, a comparison unit 1803, a window expansion unit 1805, and a determination unit 1807.

The window setting unit 1801 is configured to set a first window for a time series with anomalous points, wherein a first anomalous point is taken as a starting position of the first window.

The comparison unit 1803 is configured to: for the first window, determine whether the number of anomalous points within the first window is not smaller than TH4. In an exemplary embodiment, TH4 is proportional to the current window length.

The window expansion unit 1805 is configured to expand the first window by a preset length to obtain a second window, if the number of anomalous points on the first window is not smaller than TH4; and consecutively perform the operation of expanding the window by the preset length, until at least one of the following conditions is met:

- the number of anomalous points within the window is not increased for a preset number of consecutive expansions, or
- the consecutively expanded window is not smaller than a maximum window threshold, or
- the number of anomalous points within the window is smaller than the fourth preset threshold; and
- the determination unit 1807 is configured to determine the window before the consecutive expansions as the anomalous interval.

The window setting unit 1801 is further configured to shift the first window to arrive at a third window, if the number of anomalous points within the first window is smaller than the fourth preset threshold, wherein a second anomalous point is taken as a starting position of the third window, and a length of the third window is equal to that of the first window.

The comparison unit 1803 is further configured to determine whether the number of anomalous points on the third window is not smaller than TH4.

The window expansion unit 1805 is further configured to expand the third window by the preset length to obtain a fourth window, if the number of anomalous points on the third window is not smaller than TH4, and consecutively perform the operation of expanding the window by the preset length until at least one of the following conditions is met:

- the number of anomalous points within the window is not increased for a preset number of consecutive expansions, or
- the consecutively expanded window is not smaller than a maximum window threshold, or
- the number of anomalous points within the window is smaller than the fourth preset threshold; and
- the determination unit 1807 is further configured to determine the window before the consecutive expansions as the anomalous interval.

After one anomalous interval is determined, the window setting unit 1801 is further configured to shift the window of the anomalous interval to reach a fifth window. The next anomalous point after the previously described window of the anomalous interval is taken as a starting position of the fifth window, and a length of the fifth window is equal to that of the first window.

Although a separate anomalous interval detection device 1800 is shown in the present disclosure to perform the above anomalous interval detection method 1000 based on a dynamic sliding window, it should be understood that in an exemplary embodiment, the anomalous interval detection device 1800 shown in FIG. 18 may be included in the anomaly detection device 1600 shown in FIG. 16 or the anomaly detection device 1700 shown in FIG. 17, or may be included in an anomaly detection device which is implemented by a separate device and performs the FFT-IFFT-based anomalous point detection method 400 with valid check and the anomalous point detection method 900 based on gradual change characteristics of data.

Figure 19:
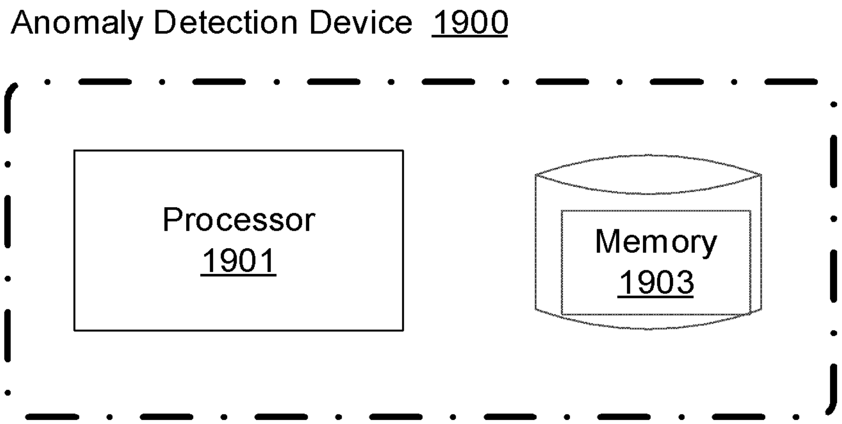
FIG. 19 schematically illustrates a structural block diagram of an anomaly detection device according to another exemplary embodiment of the present disclosure.

The structure of an anomaly detection device according to another exemplary embodiment of the present disclosure will be described below with reference to FIG. 19. FIG. 19 schematically illustrates a structural block diagram of an anomaly detection device 1900 according to another exemplary embodiment of the present disclosure. The anomaly detection device 1900 in FIG. 19 may perform the FFT-IFFT-based anomalous point detection method 400 with valid check according to an exemplary embodiment of the present disclosure, the anomalous point detection method 900 based on gradual change characteristics of data according to an exemplary embodiment of the present disclosure, and the anomalous interval detection method 1000 based on a dynamic sliding window according to an exemplary embodiment of the present disclosure, respectively. Therefore, some detailed descriptions related to the anomaly detection device 1900 may refer to the corresponding descriptions in the methods 400, 900 and 1000 as previously described.

As shown in FIG. 19, the anomaly detection device 1900 includes: a processing unit or a processor 1901, which may be a single unit or a combination of multiple units, for performing different steps of methods; a memory 1903 storing computer executable instructions which, when executed by the processor 1901, can cause the anomaly detection device 1900 to perform the method 400, and/or the method 900, and/or the method 1000. For simplicity, only the schematic structure of the anomaly detection device 1900 according to an exemplary embodiment of the present disclosure is described here, and details that have been described in the methods 400, 900 and 1000 described with reference FIGS. 4, 9, and 10 respectively are omitted.

In an embodiment where the anomaly detection device 1900 performs the FFT-IFFT-based anomalous point detection method 400 with valid check described in FIG. 4, the instructions, when executed by the processor 1901, cause the anomaly detection device 1900 to:

- apply FFT, high frequency filtering and IFFT to an original time series to obtain a first time series, wherein points on the original time series indicate data detected within a detection period of a node;
- compare data indicated by each point on the original time series with data indicated by a corresponding point on the first time series;
- if a difference between data indicated by a point on the original time series and data indicated by a corresponding point on the first time series is greater than TH1, perform interpolation on the point on the original time series to obtain a second time series;
- apply the FFT, the high frequency filtering, and the IFFT to the second time series to obtain a third time series; and
- determine the point on the original time series as an anomalous point of the original time series, if a difference between the data indicated by the point on the original time series and data indicated by a corresponding point on the third time series is greater than TH1.

In an exemplary embodiment, said performing the interpolation on the point on the original time series comprises: replacing a value indicated by the point on the original time series with an average value of data indicated by adjacent points of the point on the original time series.

In an exemplary embodiment, TH1 is set to a preset integer multiple of a standard deviation of the difference between the data indicated by the point on the original time series and the data indicated by the corresponding point on the first time series.

In an embodiment where the anomaly detection device 1900 performs the anomalous point detection method 900 based on gradual change characteristics of data described in FIG. 9, the instructions, when executed by the processor 1901, cause the anomaly detection device 1900 to perform the following operations: for a time within the detection period of the node,

- extracting data detected at the time of each of detection cycles within the detection period to generate a time series at the time, wherein points on the time series at the time indicate data detected at the time within respective detection cycles;
- calculating a distance between each point and adjacent points on the time series at the time;
- comparing a calculated maximum distance with TH2; and
- determining a point with the maximum distance as an anomalous point, if the maximum distance is greater than TH2.

In an exemplary embodiment, the instructions, when executed by the processor 1901, further cause the anomaly detection device 1900 to repeat the operations of calculating, comparing, and determining, for points other than anomalous points on the time series at the time, until the maximum distance is not greater than TH2, or the number of the determined anomalous points is greater than TH3.

In an exemplary embodiment, the distance between each point and the adjacent points is an average of distances of the point from a previous point and from a next point.

In an exemplary embodiment, the instructions, when executed by the processor 1901, further cause the anomaly detection device 1900 to, before the distance between each point on the time series at the time and the adjacent points is calculated, preprocess the data indicated by the point on the time series at the time.

The preprocessing may comprise at least one of: discarding all NaN values; and normalizing the data.

In an exemplary embodiment, TH2 is set by a grid method.

In an embodiment where the anomaly detection device 1900 performs the anomalous interval detection method 1000 based on dynamic sliding window described in FIG. 10, the instructions, when executed by the processor 1901, cause the anomaly detection device 1900 to perform the following operations:

- setting a first window for a time series with anomalous points, wherein a first anomalous point is taken as a starting position of the first window; and
- for the first window, performing an operation of determining an anomalous interval, which comprises:
- determining whether a number of anomalous points within the first window is not smaller than TH4;
- expanding the first window by a preset length to obtain a second window, if the number of anomalous points within the first window is not smaller than TH4;
- consecutively performing the operation of expanding the window by the preset length, until at least one of following conditions is met:
- the number of anomalous points within the window is not increased for a preset number of consecutive expansions, or
- the consecutively expanded window is not smaller than a maximum window threshold; or
- the number of anomalous points within the window is smaller than the fourth preset threshold; and
- determining the window before the consecutive extensions as the anomalous interval.

The instructions, when executed by the processor 1901, further cause the anomaly detection device 1900 to perform the following operations:

- shifting the first window to arrive at a third window, if the number of anomalous points within the first window is smaller than TH4, wherein a second anomalous point is taken as a starting position of the third window, and a length of the third window is equal to that of the first window;
- determining whether the number of anomalous points within the third window is not smaller than TH4;
- expanding the third window by the preset length to obtain a fourth window, if the number of anomalous points within the third window is not smaller than TH4;
- consecutively performing the operation of expanding the window by the preset length, until at least one of following conditions is met:
- the number of anomalous points within the window is not increased for a preset number of consecutive expansions, or
- the consecutively expanded window is not smaller than a maximum window threshold, or
- the number of anomalous points within the window is smaller than the fourth preset threshold; and
- determining the window before the consecutive expansions as the anomalous interval.

In an exemplary embodiment, the instructions, when executed by the processor 1901, further cause the anomaly detection device 1900 to: continuously shift the window of the anomalous interval to reach a fifth window, wherein the next anomalous point after the previously described window of the anomalous interval is taken as a starting position of the fifth window, and a length of the fifth window is equal to that of the first window; and perform the operations of determining the anomalous interval.

As described above, the anomaly detection method according to an exemplary embodiment of the present disclosure may avoid the false negative detection and the false positive detection of the anomalous points on the time series data effectively, thereby improving the precision and the recall rate of the anomaly detection.

The program running on the device according to the present disclosure may be a program that causes a computer to realize the functions of embodiments of the present disclosure by controlling a central processing unit (CPU). The program or information processed by the program may be temporarily stored in volatile memory (such as random access memory RAM), hard disk drive (HDD), non-volatile memory (such as flash memory), or other memory systems.

The program for realizing the functions of embodiments of the present disclosure may be recorded on a computer-readable recording medium. The respective functions can be realized by causing the computer system to read the program recorded on the recording medium and execute the program. The so-called “computer system” here may be a computer system embedded in the device, and may include an operating system or hardware (such as a peripheral devices). The “computer-readable recording medium” may be a semiconductor recording medium, an optical recording medium, a magnetic recording medium, a recording medium that dynamically stores a program for a short time, or any other recording medium readable by a computer.

Various features or functional modules of the device used in the above-described embodiments may be implemented or executed by circuits (for example, single-chip or multi-chip integrated circuits). Circuits designed to perform the functions described in this specification may include general-purpose processors, digital signal processors (DSPs), application specific integrated circuits (ASICs), field programmable gate arrays (FPGAs), or other programmable logic devices, discrete Gate or transistor logic, discrete hardware components, or any combination of the above devices. A general-purpose processor may be a microprocessor, or any existing processor, controller, microcontroller, or state machine. The above circuit may be a digital circuit or an analog circuit. When new integrated circuit technologies that replace existing integrated circuits appear due to advances in semiconductor technology, one or more embodiments of the present disclosure may also be implemented using these new integrated circuit technologies.

As above, the embodiments of the present disclosure have been described in detail with reference to the drawings. However, the specific structure is not limited to the above embodiments, and the present disclosure also includes any design changes that do not deviate from the gist of the present disclosure. In addition, various changes can be made to the present disclosure within the scope of the claims, and embodiments obtained by appropriately combining the technical means disclosed in different embodiments are also included in the technical scope of the present disclosure. In addition, components having the same effect described in the above embodiments can be replaced with each other.

The above description is only the preferred embodiments of the present application and the explanation of the applied technical principles. Those skilled in the art should understand that the scope of the invention involved in the present disclosure is not limited to the technical solutions formed by the specific combination of the above technical features, but should also cover other technical solutions formed by any combination of the above technical features and equivalents thereof, without departing from the inventive concept, e.g., technical solutions formed by the above features and the technical features with similar functions disclosed in the present disclosure (but not limited thereto) being replaced with each other.

The invention claimed is:

1. A method of anomaly detection performed in a device, the device comprising:
- processing circuitry;
- memory containing instructions executable by the processing circuitry, the method comprising:
- applying Fast Fourier transform (FFT), high frequency filtering, and Inverse Fast Fourier transform (IFFT) to an original time series to obtain a first time series, wherein points on the original time series indicate data detected within a detection period of a node;
- comparing data indicated by each point on the original time series with data indicated by a corresponding point on the first time series;
- in response to a difference between data indicated by a point on the original time series and data indicated by a corresponding point on the first time series being greater than a first preset threshold:
  - performing interpolation on the point on the original time series to obtain a second time series;
  - applying the FFT, the high frequency filtering, and the IFFT to the second time series to obtain a third time series;
  - determining the point on the original time series as an anomalous point of the original time series if a difference between the data indicated by the point on the original time series and data indicated by a corresponding point on the third time series is greater than the first preset threshold; and
  - using, by the device, information identifying the anomalous point for at least one of:
  - removing the anomalous point from the original time series prior to further analysis or processing of the time series, or
  - providing anomaly information for use by a network management system that monitors traffic of the node.

2. The method of claim 1, wherein the performing the interpolation on the point on the original time series comprises replacing a value indicated by the point on the original time series with an average value of data indicated by adjacent points of the point on the original time series.

3. The method of claim 1, wherein the first preset threshold is set to a preset integer multiple of a standard deviation of the difference between the data indicated by the point on the original time series and the data indicated by the corresponding point on the first time series.

4. The method of claim 1, further comprising, for a time within a detection cycle of the node:
- extracting data detected at the time of each of detection cycles within the detection period to generate a time series at the time, wherein points on the time series at the time indicate data detected at the time within respective detection cycles;
- calculating a distance between each point and adjacent points on the time series at the time;
- comparing a calculated maximum distance with a second preset threshold; and
- determining a point with the maximum distance as an anomalous point if the maximum distance is greater than the second preset threshold.

5. The method of claim 4, further comprising repeating the calculating, comparing, and determining for points other than the anomalous point on the time series at the time, until the maximum distance is not greater than the second preset threshold, or a number of the determined anomalous points is greater than a third preset threshold.

6. The method of claim 4, wherein the distance between each point and the adjacent points is an average of distances of the point from a previous point and from a next point.

7. The method of claim 4:
- wherein before the distance between each point on the time series at the time and the adjacent points is calculated, the data indicated by the point on the time series at the time is preprocessed;
- wherein the preprocessing comprises discarding all Not a Number values and/or normalizing the data.

8. The method of claim 4, wherein the second preset threshold is set by a grid method.

9. The method of claim 1, further comprising:
- setting a first window for a time series with anomalous points, wherein a first anomalous point is taken as a starting position of the first window; and
- for the first window, performing an operation of determining an anomalous interval, the operation of determining the anomalous interval comprising:
  - determining whether a number of anomalous points within the first window is not smaller than a fourth preset threshold;

expanding the first window by a preset length to obtain a second window if the number of anomalous points within the first window is not smaller than the fourth preset threshold;

consecutively performing the operation of expanding the window by the preset length, until:

the number of anomalous points within the window is not increased for a preset number of consecutive expansions;

the consecutively expanded window is not smaller than a maximum window threshold; and/or the number of anomalous points within the window is smaller than the fourth preset threshold;

determining the window before the consecutive expansions as the anomalous interval.

10. The method of claim 9, further comprising:

shifting the first window to arrive at a third window if the number of anomalous points within the first window is smaller than the fourth preset threshold, wherein a second anomalous point is taken as a starting position of the third window, and a length of the third window is equal to that of the first window;

determining whether the number of anomalous points within the third window is not smaller than the fourth preset threshold;

expanding the third window by the preset length to obtain a fourth window if the number of anomalous points within the third window is not smaller than the fourth preset threshold;

consecutively performing the operation of expanding the window by the preset length, until at least one of following conditions is met:

the number of anomalous points within the window is not increased for a preset number of consecutive expansions;

the consecutively expanded window is not smaller than a maximum window threshold; and/or the number of anomalous points within the window is smaller than the fourth preset threshold; and determining the window before the consecutive expansions as the anomalous interval.

11. The method of claim 9, wherein the fourth preset threshold is proportional to a current window length.

12. An anomaly detection device, comprising:

processing circuitry;

memory containing instructions executable by the processing circuitry whereby the anomaly detection device is operative to:

apply Fast Fourier transform (FFT), high frequency filtering, and Inverse Fast Fourier transform (IFFT) to an original time series to obtain a first time series, wherein points on the original time series indicate data detected within a detection period of a node;

compare data indicated by each point on the original time series with data indicated by a corresponding point on the first time series;

in response to a difference between data indicated by a point on the original time series and data indicated by a corresponding point on the first time series being greater than a first preset threshold:

perform interpolation on the point on the original time series to obtain a second time series;

apply the FFT, the high frequency filtering, and the IFFT to the second time series to obtain a third time series;

determine the point on the original time series as an anomalous point of the original time series if a difference between the data indicated by the point on the original time series and data indicated by a corresponding point on the third time series is greater than the first preset threshold; and using, by the device, information identifying the anomalous point for at least one of:

removing the anomalous point from the original time series prior to further analysis or processing of the time series, or providing anomaly information for use by a network management system that monitors traffic of the node.

13. The anomaly detection device of claim 12, wherein the instructions are such that the anomaly detection device is operative to, for a time within a detection cycle of the node:

extract data detected at the time of each of detection cycles within the detection period to generate a time series at the time, wherein points on the time series at the time indicate data detected at the time within respective detection cycles;

calculate a distance between each point and adjacent points on the time series at the time;

compare a calculated maximum distance with a second preset threshold; and determine a point with the maximum distance as an anomalous point if the maximum distance is greater than the second preset threshold.

14. The anomaly detection device of claim 13, wherein the instructions are such that the anomaly detection device is operative to repeat the calculating, comparing, and determining for points other than the anomalous point on the time series at the time, until the maximum distance is not greater than the second preset threshold, or a number of the determined anomalous points is greater than a third preset threshold.

15. The anomaly detection device of claim 13, wherein the distance between each point and the adjacent points is an average of distances of the point from a previous point and from a next point.

16. A non-transitory computer readable recording medium storing a computer program product for controlling anomaly detection, the computer program product comprising program instructions which, when run on processing circuitry of an anomaly detection device, causes the anomaly detection device to:

apply Fast Fourier transform (FFT), high frequency filtering, and Inverse Fast Fourier transform (IFFT) to an original time series to obtain a first time series, wherein points on the original time series indicate data detected within a detection period of a node;

compare data indicated by each point on the original time series with data indicated by a corresponding point on the first time series;

in response to a difference between data indicated by a point on the original time series and data indicated by a corresponding point on the first time series being greater than a first preset threshold:

perform interpolation on the point on the original time series to obtain a second time series;

apply the FFT, the high frequency filtering, and the IFFT to the second time series to obtain a third time series;

determine the point on the original time series as an anomalous point of the original time series if a difference between the data indicated by the point on the original time series and data indicated by a corresponding point on the third time series is greater than the first preset threshold; and using, by the device, information identifying the anomalous point for at least one of:

removing the anomalous point from the original time series prior to further analysis or processing of the time series, or providing anomaly information for use by a network management system that monitors traffic of the node.

* * * * *